United States Patent
Hino et al.

(10) Patent No.: US 7,854,552 B2
(45) Date of Patent: Dec. 21, 2010

(54) HYDRODYNAMIC BEARING DEVICE, SPINDLE MOTOR EQUIPPED WITH SAME, AND RECORDING AND REPRODUCING APPARATUS

(75) Inventors: Toshifumi Hino, Ehime (JP); Nobuhiko Sato, Ehime (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 12/024,502

(22) Filed: Feb. 1, 2008

(65) Prior Publication Data

US 2008/0298730 A1 Dec. 4, 2008

(30) Foreign Application Priority Data

May 28, 2007 (JP) .............................. 2007-140991

(51) Int. Cl.
*F16C 32/06* (2006.01)

(52) U.S. Cl. .................. 384/107; 384/100; 384/113; 384/115; 310/90; 360/99.08

(58) Field of Classification Search .................. 384/100, 384/107, 112–113, 115; 310/90, 90.15; 360/99.08
See application file for complete search history.

(56) References Cited

U.S. PATENT DOCUMENTS

| | | | |
|---|---|---|---|
| 6,271,612 B1 * | 8/2001 | Tanaka et al. ................ | 310/90 |
| 6,307,293 B1 * | 10/2001 | Ichiyama .................... | 310/90.5 |
| 6,793,394 B2 | 9/2004 | Gomyo et al. | |
| 7,063,462 B2 * | 6/2006 | Aiello et al. ................ | 384/107 |
| 7,101,084 B2 * | 9/2006 | Gomyo ........................ | 384/107 |
| 7,241,050 B2 * | 7/2007 | Uenosono et al. ........... | 384/107 |
| 7,527,432 B2 * | 5/2009 | Asada et al. ................. | 384/107 |
| 2001/0022869 A1 * | 9/2001 | Tanaka et al. ............... | 384/100 |
| 2003/0011929 A1 * | 1/2003 | Nii et al. ................... | 360/99.08 |
| 2006/0008190 A1 * | 1/2006 | Hamada et al. ............. | 384/100 |
| 2006/0140521 A1 * | 6/2006 | Uenosono et al. ........... | 384/100 |
| 2007/0103020 A1 * | 5/2007 | Obara et al. ................. | 384/112 |
| 2007/0140605 A1 * | 6/2007 | Asada et al. ................. | 384/107 |
| 2007/0230840 A1 * | 10/2007 | Asada et al. ................. | 384/107 |
| 2007/0230841 A1 * | 10/2007 | Yano et al. .................. | 384/113 |

FOREIGN PATENT DOCUMENTS

| | | |
|---|---|---|
| JP | 10-259820 | 9/1998 |
| JP | 2002147443 A * | 5/2002 |
| JP | 2003-28147 | 1/2003 |
| JP | 2005-308057 | 11/2005 |
| JP | 2007162922 A * | 6/2007 |

* cited by examiner

*Primary Examiner*—Marcus Charles
(74) *Attorney, Agent, or Firm*—Wenderoth, Lind & Ponack, L.L.P.

(57) ABSTRACT

A hydrodynamic bearing device comprises a sleeve, a shaft, and a flange cover. The sleeve has a bearing hole and a communicating hole which communicates between both end faces. The shaft is disposed in a state of being capable of relative rotation in the bearing hole of the sleeve, and has a main portion, a flange that is larger in diameter than the main portion, and a communicating hole that communicates with both end faces of the flange. The flange cover is disposed opposing to the lower face of the flange. The pressure loss at the communicating hole is smaller than the pressure loss at the communicating hole.

19 Claims, 12 Drawing Sheets

HYDRODYNAMIC BEARING DEVICE, SPINDLE MOTOR EQUIPPED WITH SAME, AND RECORDING AND REPRODUCING APPARATUS

TECHNICAL FIELD

The present invention relates to a hydrodynamic bearing device installed in a motor for rotationally driving a magnetic disk, optical disk, or other such recording disk, and more particularly relates to a hydrodynamic bearing device that helps reduce the size of portable devices, and to a spindle motor and recording and reproducing apparatus equipped with this hydrodynamic bearing device.

BACKGROUND ART

A hydrodynamic bearing device, which utilizes the fluid pressure of an oil or other lubricating fluid interposed between a shaft and a sleeve to support the two so as to be capable of relative rotation, has been proposed as a bearing for spindle motors, which are used in recording apparatus for rotationally driving a disk-shaped recording medium, such as a magnetic disk, optical disk, or magneto optical disk.

A series of microscopic clearances are formed between the shaft and the sleeve, and a hydrodynamic groove that is formed in the peripheral direction of the rotary shaft (called a radial hydrodynamic groove), and a hydrodynamic groove that is formed in the radial direction of the rotary shaft (called a thrust hydrodynamic groove), are formed in the shaft and/or the sleeve. Oil is held as a lubricating fluid in these microscopic clearances. One type of such hydrodynamic bearing devices has a structure in which a taper seal is formed at the end of the series of microscopic clearances and exposed to the atmosphere, which is called a single-pocket structure.

With the single-pocket hydrodynamic bearing device of Patent Document 1, the shaft has a large-diameter flange at the lower end, and a flange cover is disposed opposing to the flange. A thrust hydrodynamic groove is formed in the flange and/or the flange cover. The faces are flat everywhere except in the portion where the thrust hydrodynamic groove is formed.

With a conventional hydrodynamic bearing device structured like this, when the shaft begins to rotate, the lubricating fluid is drawn into the radial and thrust bearing portion by the pumping pressure generated by the hydrodynamic grooves, and the fluid pressure rises within the hydrodynamic grooves. This results in a state in which the shaft and sleeve are able to rotate relative to each other without contact.

In some cases, communicating holes are provided in the inner periphery of the flange, as seen in Patent Document 2, for example, in order to eliminate the pressure imbalance at the top and bottom of the thrust bearing portion during rotation.

Patent Document 1: Japanese Laid-Open Patent Application 2005-308057
Patent Document 2: Japanese Laid-Open Patent Application 2003-28147

SUMMARY OF THE INVENTION

With a conventional hydrodynamic bearing device, because the flange and the flange cover are made up of flat faces, and furthermore because the clearance around the flange is relatively narrow (about 0.1 mm), vibration or impact due to a fall or the like tends to generate a portion of negative pressure at the middle of the flange, so bubbles may be generated and as a result the lubricating fluid may leak out from the taper seal.

The mechanism of bubble generation will now be described. The rotor magnet and the base which are made of a magnetic material magnetically attract each other, and therefore when the hydrodynamic bearing device is stopped, the flange and the flange cover come into contact with each other. If a dropping impact or vibration is applied to the hydrodynamic bearing device, the flange rises with the shaft, then the space between the sleeve and flange cover and the area around the flange increases by a volume corresponding to how far an axis portion above the flange of the shaft has risen. When the shaft rises, the lubricating fluid present on the top face of the flange in a stopped state attempts to move below the flange through the narrow clearance between the lower end of the sleeve and the outer periphery of the flange. If the movement of the shaft is too sudden, however, the lubricating fluid will be prevented by its own viscosity from sufficiently moving below the flange. As a result, and coupled with the fact that the space between the flange and flange cover and the area around the flange increases by a volume corresponding to how far the axis portion above the flange of the shaft has risen, a negative pressure portion is created below the flange.

The hydrodynamic bearing device is filled with lubricating fluid under a vacuum environment during its assembly so that the microscopic clearances inside the bearing portion will be reliably filled with lubricating fluid. Since the lubricating fluid is also exposed to a vacuum environment here, immediately after the assembly of the hydrodynamic bearing device almost none of the gaseous components in the air are dissolved into the lubricating fluid. However, when the bearing is returned to atmospheric pressure and time passes, gaseous components in the air (oxygen, nitrogen, carbon dioxide, etc.) gradually dissolve into the lubricating fluid. The amount of this dissolution is proportional to the partial pressure of each gas.

If, as discussed above, the flange moves suddenly and there is a sharp decrease in the pressure of the middle part below the flange from its ordinary atmospheric pressure, there is a greater likelihood that air and so forth dissolved in the lubricating fluid will generate bubbles. Whereas the dissolution of gases proceeds very slowly, these bubbles are generated almost instantaneously. Here, if the flange rises gradually, the surface of the lubricating fluid in the taper seal usually falls by an amount corresponding to the volume by which the shaft has moved. However, if bubbles are generated by a concussive rise of the flange, the surface of the lubricating fluid that is exposed to the atmosphere at the taper seal will try to rise by an amount corresponding to the volume of the bubbles. As a result, either the drop of the lubricating fluid level due to the rise of the flange will be very slight, or there is even the possibility that the lubricating fluid level will rise.

If a shaft that has risen should drop suddenly in a state in which bubbles have been generated, the bubbles generated below the flange will be flattened out and rise from around the flange before they can redissolve into the lubricating fluid. The lubricating fluid and bubbles that are pushed out rise through the radial bearing portion, communicating holes, and so forth. When this happens, the surface of the lubricating fluid that is exposed to the atmosphere at the taper seal will rise even more than in the above-mentioned state in which the flange has risen suddenly, by an amount corresponding to the volume of the bubbles generated at the flange. As a result, there is the risk that the lubricating fluid will leak out at the taper seal. If the taper seal has a sufficiently large volume, the leakage of lubricating fluid can be prevented. However, preventing the leakage of lubricating fluid requires a reduction in the region that can be occupied by the hydrodynamic grooves, where space is already limited, which means that the required bearing performance cannot be ensured.

In particular, when communicating holes are provided passing through at the top and bottom of the sleeve for the purpose of pressure equalization, the lubricating fluid is more apt to flow through the communicating holes than through the radial bearing portion, which means that a volume of lubricating fluid equivalent to the bubbles ends up being spouted out of the communicating holes. One or more communicating holes are usually provided in a region away from the center axis of the bearing in the radial direction. Therefore, the lubricating fluid spouted out through these communicating holes may cause the lubricating fluid level to suddenly rise only near the openings of the communicating holes, and the lubricating fluid may leak out from the taper seal located closest to the communicating holes. If the lubricating fluid leaks out, it can adversely affect the durability and performance of the hydrodynamic bearing device.

Furthermore, even if communicating holes that communicate with the top and bottom of the flange are provided on the inner peripheral side of the flange as in Patent Document 2, if the communicating holes in the flange are not large enough, the flow resistance will be high as the lubricating fluid moves from the top face of the flange toward the bottom face, so the pressure differential cannot be reduced sufficiently between the top and bottom of the flange. Therefore, if an impact should cause the shaft to rise suddenly, negative pressure will tend to occur at the bottom face of the flange, and as a result bubbles will tend to be generated.

It is an object of the present invention to provide a hydrodynamic bearing device with which the generation of negative pressure inside the bearing portion can be prevented, and durability and reliability can be increased, even when the hydrodynamic bearing device is subjected to impact or vibration, and to provide a spindle motor and a recording and reproducing apparatus equipped with this hydrodynamic bearing device.

The hydrodynamic bearing device pertaining to the first invention comprises a sleeve, a shaft, a lubricating fluid, a bearing portion, a flange cover, and a first communicating hole. The sleeve has an insertion hole that opens at one end. The shaft is disposed in the insertion hole of the sleeve so as to be capable of rotation relative to the sleeve, and has a main portion and a large-diameter portion provided to the main portion and having a larger diameter than the main portion. The lubricating fluid fills a clearance formed between the sleeve and the shaft. The bearing portion supports the sleeve and the shaft in the rotational direction and the axial direction, with the lubricating fluid interposed in between, so as to allow relative rotation between the sleeve and shaft. The flange cover is fixed to the sleeve on one end side in the axial direction of the shaft, and is disposed opposing to one face of the large-diameter portion. The first communicating hole is at least one hole which communicates between the one face of the large-diameter portion that is opposing to the flange cover and another face that is not opposing to the flange cover. The sleeve has at least one second communicating hole which communicates between the two end faces of the sleeve, and the shape and number of the communicating holes are determined such that the pressure loss between the two ends of the at least one first communicating hole will be less than the pressure loss between the two ends of the at least one second communicating hole.

The first and second communicating holes are not limited to being circular holes, as long as both end faces of the sleeve and the large-diameter portion individually communicate, and may instead be non-circular holes, including semicircular and polyhedral shapes. These may also be in the form of a groove. For example, when the shaft or sleeve are constituted by two members, a groove or the like may be formed between the two members to constitute the first communicating hole or second communicating hole.

Also, the large-diameter portion of the shaft may be a flange part that constitutes the bearing support portion in the axial direction, or may be a retainer part that keeps the shaft from coming loose from the sleeve.

Here, when the shaft moves up or down relative to the sleeve, the lubricating fluid flows through the first and second communicating holes. At this point the pressure loss between both ends of the first communicating hole provided to the large-diameter portion of the shaft is lower than that of the second communicating hole provided to the sleeve, so the lubricating fluid flows more easily through the first communicating hole than the second communicating hole. Accordingly, even if the shaft should rise suddenly with respect to the sleeve away from the flange cover, the lubricating fluid located on the opening side of the insertion hole from the large-diameter portion will flow less readily through the second communicating hole, and will flow more readily through the first communicating hole to the end of the shaft where negative pressure tends to be generated.

Therefore, even if the hydrodynamic bearing device should be subjected to impact or vibration so that the shaft and sleeve violently move up or down relative to one another, the lubricating fluid will flow from the first communicating hole to the middle part of the flange, and negative pressure will tend not to be generated in the lubricating fluid.

Also, if the shaft should subsequently undergo a sudden drop relative to the sleeve, the lubricating fluid will flow from the first communicating hole to another face of the large-diameter portion. As a result, the lubricating fluid flows less readily to the second communicating hole during up or down movement, and pressure pulsation is attenuated in the second communicating hole. This prevents such problems as leakage of the lubricating fluid caused by the generation of bubbles in the lubricating fluid filled in the bearing portion, and improves the durability and reliability of the hydrodynamic bearing device.

The hydrodynamic bearing device pertaining to the second invention is the hydrodynamic bearing device pertaining to the first invention, wherein the equivalent diameter (Df), length (Lf), and number (Nf) of the first communicating hole and the equivalent diameter (Ds), length (Ls), and number (Ns) of the second communicating hole satisfy the following relational formula (1):

$$\frac{Df}{Ds} > \sqrt[n]{\left(\frac{Ns}{Nf}\right)^m \left(\frac{Lf}{Ls}\right)} \tag{1}$$

and the equivalent diameters Df and Ds of the first and second communicating holes are four times of the quotients obtained by dividing the cross sectional areas Af and As of the first and second communicating holes by the peripheral lengths Lf and Ls, respectively, as expressed by the following relational formula (2):

$$Ds = 4\frac{As}{Ss}, \quad Df = 4\frac{Af}{Sf} \qquad (2)$$

where the constants n and m in the relational formula (1) are numbers greater than or equal to 1, and the combination of the constants (n, m) satisfies at least one of (4, 1), 4.75, 1.75), and (5, 2).

An equivalent diameter De is defined from the following formula, and is a representative length indicating the diameter of circular tubes that can be considered equivalent from the standpoint of flow.

$$De = 4A/S$$

Where:

A: flow path sectional area

S: wet edge length (length of side wall in cross section)

When the shaft moves up or down relative to the sleeve, the lubricating fluid tries to move through the first and second communicating holes provided respectively to the large-diameter portion and the sleeve. When this happens, if the pressure loss at the point when the flow through the first communicating hole from upstream toward downstream is lower than the pressure loss at the second communicating hole, the lubricating fluid will flow readily to one end of the shaft where negative pressure tends to be generated, and negative pressure will be generated less readily.

Specifically, if we let P1 be the pressure at the upstream end of the first communicating hole, P2 be the pressure at the downstream end, P3 be the pressure at the upstream end of the second communicating hole, and P4 be the pressure at the downstream end, then the shape and number of the first and second communicating holes should be set to satisfy {absolute value of (P1−P2)}<{absolute value of (P3−P4)}. Usually, if there is no hydrodynamic groove between the exit (or entrance) of the first communicating hole and the entrance (or exit) of the second communicating hole, the pressure P2 at the exit (or entrance) of the first communicating hole is the same as the pressure P3 at the entrance (or exit) of the second communicating hole.

In this case, as mentioned above, the lubricating fluid moves smoothly to the first communicating hole, so even if an impact should cause up or down movement, negative pressure will not be readily generated within the bearing portion, and bubbles will not form, so leakage of the lubricating fluid from the second communicating hole on the sleeve side can be effectively suppressed.

We will now describe the process of deriving Relational Formula 1, which specifies the relationship of the shape and number of the first and second communicating holes from the relationship of pressure loss.

As shown in FIG. 1, the pressure loss Δp is defined as follows when a fluid with a density ρ and a viscosity μ flows at an average velocity v in a tube with a diameter d and a length L. Here, however, we will treat the flow as being sufficiently steady-state, in which there is no change in the velocity distribution in the tube axial direction, in order to simplify calculation.

The pressure decrease Δp in FIG. 1 is produced by the friction of the fluid, and can be expressed as in the following Relational Formula 3 if we use Darcy's friction factor λ.

$$\Delta p = \lambda \frac{L}{d} \frac{\rho v^2}{2} \qquad (3)$$

It has been proven experimentally that λ is generally a function of the roughness of the tube wall and the Reynolds's number Re. In the case of a tube, the Reynolds's number Re here is expressed as in the following Relational Formula 4.

$$Re = \frac{\rho v d}{\mu} \qquad (4)$$

Incidentally, with hydrodynamic bearing devices in spindle motors used in hard disk drive and so forth, the Reynolds's number Re is 10 or less in an ordinary operating state, and the flow may be treated as a laminar flow. On the other hand, if a sudden change occurs due to a dropping impact or the like, it is believed that the Reynolds's number Re is about $10^3$ to $10^4$.

(1) When the impact is relatively small

In this case, the friction factor λ is hardly affected by roughness, and the flow can be treated as a laminar flow. Here, the friction factor λ is expressed by the following Relational Formula 5 using the Hagen-Poiseulli equation.

$$\lambda = \frac{64}{Re} \qquad (5)$$

Furthermore, since the flow quantity Q per unit of time is expressed by the Relational Formula 6 using the average velocity v and the tube diameter d, $$Q = \frac{\pi d^2}{4} v \qquad (6)$$

if we substitute Relational Formulas 4, 5, and 6 for Relational Formula 3, the pressure loss Δp is derived as in the following Relational Formula 7.

$$\Delta p = \lambda \frac{L}{d} \frac{\rho v^2}{2} = \frac{64\mu}{\rho v d} \frac{L}{d} \frac{\rho v^2}{2} = \frac{32\mu L}{d^2} \frac{4}{\pi d^2} Q = \frac{128\mu L}{\pi d^4} Q \qquad (7)$$

(2) When the impact is relatively large

In this case, the friction factor λ is affected by roughness, and the flow is treated as a turbulent flow.

(2-1) If the tube is smooth (however, Re=3000 to 100,000)

Here, the friction factor λ is expressed by the following Relational Formula 8 using Blasius' formula.

$$\lambda = \frac{0.3164}{Re^{1/4}} \qquad (8)$$

If we substitute Relational Formulas 4, 8, and 6 for Relational Formula 3, the pressure loss Δp is derived as in the following Relational Formula 9.

$$\Delta p = \lambda \frac{L}{d}\frac{\rho v^2}{2} = \frac{0.3164\mu^{1/4}}{(\rho v d)^{1/4}}\frac{L}{d}\frac{\rho v^2}{2} = \frac{0.1582\mu^{1/4}L\rho v^2}{\rho^{1/4}v^{1/4}d^{1/4}d} \quad (9)$$

$$= \frac{0.1582\mu^{1/4}L\rho^{3/4}v^{7/4}}{d^{5/4}} = \frac{0.1582\mu^{1/4}L\rho^{3/4}\left(\frac{4Q}{\pi d^2}\right)^{7/4}}{d^{5/4}}$$

$$= \frac{0.1582\mu^{1/4}L\rho^{3/4}\frac{4^{7/4}Q^{7/4}}{\pi^{7/4}d^{7/2}}}{d^{5/4}} = \frac{0.1582\frac{4^{7/4}}{\pi^{7/4}}\mu^{1/4}L\rho^{3/4}}{d^{19/4}}Q^{7/4}$$

$$= \frac{0.2414\mu^{1/4}L\rho^{3/4}}{d^{19/4}}Q^{7/4}$$

(2-2) If the tube is sufficiently rough (however, Re=3000 to 100,000)

Here, if we use Karman's formula, the friction factor λ is a function of e/d, but is unrelated to the Reynolds's number Re, and is expressed by the following Relational Formula 10. e is the average height of irregular protrusions on the tube wall.

$$\lambda = \frac{1}{\left\{1.14 - 2\log\left(\frac{e}{d}\right)\right\}^2} \equiv \lambda o \quad (10)$$

If we substitute Relational Formulas 10 and 6 for Relational Formula 3, the pressure loss Δp is derived as in the following Relational Formula 11 using the λo found from Relational Formula 10.

$$\Delta p = \lambda o \frac{L}{d}\frac{\rho v^2}{2} = \lambda o \frac{L}{d}\frac{\rho\left(\frac{4Q}{\pi d^2}\right)^2}{2} = 8\lambda o \frac{L}{d^5}\frac{\rho Q^2}{\pi^2} \quad (11)$$

As in the above-mentioned Relational Formulas 7, 9, and 11, the pressure loss Δp will have different values according to the Reynolds's number Re and the average height e.

Herein, parameters for the second communicating hole on the sleeve side will have a lower-case "s" appended, and parameters for the first communicating hole on the shaft side will have a lower-case "f" appended.

When the impact is relatively small and the flow of the lubricating fluid inside the hydrodynamic bearing device can be considered a laminar flow, the pressure losses Δps and Δpf of the second communicating hole and first communicating hole can be expressed by the following Relational Formulas 12.

$$\Delta ps = \frac{128\mu Ls}{\pi ds^4}Qs, \quad \Delta pf = \frac{128\mu Lf}{\pi df^4}Qf \quad (12)$$

When the impact is large and the flow of the lubricating fluid inside the hydrodynamic bearing device is a turbulent flow, and the inside of the communicating holes can be smooth, the pressure losses Δps and Δpf of the second communicating hole and first communicating hole can be expressed by the following Relational Formulas 13.

$$\Delta ps = \frac{0.2414\mu^{1/4}Ls\rho^{3/4}}{ds^{19/4}}Qs^{7/4}, \quad (13)$$

-continued $$\Delta pf = \frac{0.2414\mu^{1/4}Lf\rho^{3/4}}{df^{19/4}}Qf^{7/4}$$

When the impact is large, the flow of the lubricating fluid inside the hydrodynamic bearing device is a turbulent flow, and the inside of the communicating holes can be sufficiently rough, the pressure losses Δps and Δpf of the second communicating hole and first communicating hole can be expressed by the following Relational Formulas 14.

$$\Delta ps = 8\lambda os\frac{Ls}{ds^5}\frac{\rho Qs^2}{\pi^2}, \Delta pf = 8\lambda of\frac{Lf}{df^5}\frac{\rho Qf^2}{\pi^2} \quad (14)$$

Furthermore, the numbers of second and first communicating holes provided on the sleeve side and the large-diameter portion side, respectively, are termed Ns and Nf, and the following Relational Formula 15 results. To ascertain the actual behavior more precisely, the flow quantity passing the outer peripheral side of the large-diameter portion should also be taken into account. The goal here, however, is to effectively reduce the pressure loss in the first communicating hole on the large-diameter portion side below the pressure loss in the second communicating hole on the sleeve side, so the flow quantity around the outer periphery of the flange can be ignored with no problem.

$$Q = QsNs = QfNf \quad (15)$$

$$\therefore Qf = Qs\frac{Ns}{Nf}$$

If we use Relational Formula 15 to set the above-mentioned Relational Formulas 12 to 14 so that Δps>Δpf are satisfied, we can rewrite these formulas as in the following Relational Formulas 16 to 21.

(1) In the case of a laminar flow

If the flow quantity Qf in Relational Formula 12 is expressed by Qs, we obtain:

$$\Delta ps = \frac{128\mu Ls}{\pi ds^4}Qs, \quad \Delta pf = \frac{128\mu Lf}{\pi df^4}Qs\frac{Ns}{Nf} \quad (16)$$

$$\frac{128\mu Ls}{\pi ds^4}Qs > \frac{128\mu Lf}{\pi df^4}Qs\frac{Ns}{Nf}$$

and if we further rearrange this, we obtain the following.

$$\frac{df}{ds} > \sqrt[4]{\frac{Ns}{Nf}\frac{Lf}{Ls}} \quad (17)$$

(2) In the case of turbulent flow and smooth surface

If the flow quantity Qf in Relational Formula 13 is expressed by Qs, we obtain:

$$\Delta ps = \frac{0.2414\mu^{1/4}Ls\rho^{3/4}}{ds^{19/4}}Qs^{7/4}, \quad (18)$$

$$\Delta pf = \frac{0.2414\mu^{1/4}Lf\rho^{3/4}}{df^{19/4}}\left(Qs\frac{Ns}{Nf}\right)^{7/4}$$

$$\frac{0.2414\mu^{1/4}Ls\rho^{3/4}}{ds^{19/4}}Qs^{7/4} > \frac{0.2414\mu^{1/4}Lf\rho^{3/4}}{df^{19/4}}\left(Qs\frac{Ns}{Nf}\right)^{7/4}$$

and if we further rearrange this, we obtain the following.

$$\frac{df}{ds} > \sqrt[19/4]{\left(\frac{Ns}{Nf}\right)^{7/4}\frac{Lf}{Ls}} \quad (19)$$

(3) In the case of turbulent flow and rough surface

If the flow quantity Qf in Relational Formula 14 is expressed by Qs, we obtain:

$$\Delta ps = 8\lambda os \frac{Ls}{ds^5}\frac{\rho Qs^2}{\pi^2}, \quad (20)$$

$$\Delta pf = 8\lambda of \frac{Lf}{df^5}\frac{\rho\left(Qs\frac{Ns}{Nf}\right)^2}{\pi^2}$$

$$8\lambda os \frac{Ls}{ds^5}\frac{\rho Qs^2}{\pi^2} > 8\lambda of \frac{Lf}{df^5}\frac{\rho\left(Qs\frac{Ns}{Nf}\right)^2}{\pi^2}$$

and if we further rearrange this, we obtain the following.

$$\frac{df}{ds} > \sqrt[5]{\left(\frac{Ns}{Nf}\right)^2 \frac{Lf}{Ls}\frac{\lambda of}{\lambda os}} \quad (20')$$

Here, $\lambda of$ and $\lambda os$ can take different values according to the e/d of the respective communicating holes, but when e/d is 0.1 or less, for example, even when e/d is 0.05 (½), the deviation of $(\lambda of/\lambda os)^{0.2}$ from 1 will only be about 7% at most. And even when e/d is 0.025 (¼), the deviation is only about 14%. We can conclude from this that different e/d values have only minimal effect in actual practice. Therefore, Relational Formula 20' can be rewritten as follows.

$$\frac{df}{ds} > \sqrt[5]{\left(\frac{Ns}{Nf}\right)^2 \frac{Lf}{Ls}} \quad (21)$$

Specifically, regardless of whether the flow is laminar flow or turbulent flow, or whether the surface is smooth or rough, the conditions are adjusted for reducing the pressure loss of the first communicating hole smaller than the pressure loss of the second communicating hole as in the above-mentioned Relational Formula 1.

For instance, when Ds=0.4 mm, Ns=1, Ls=1.65 mm, and Lf=0.45 mm, the equivalent diameter Df found from the above-mentioned Relational Formulas 17, 19, and 21 was found for when Nf=2 and 3. These results are shown in Table 1.

TABLE 1

|    |        | Laminar flow | Turbulent flow (smooth surface) | Turbulent flow (rough surface) | Max/Min |
|----|--------|--------------|----------------------------------|--------------------------------|---------|
|    | n      | 4            | 4.75                             | 5                              | —       |
|    | m      | 1            | 1.75                             | 2                              | —       |
| Df | Nf = 2 | 0.2431       | 0.2357                           | 0.2338                         | 1.040   |
|    | Nf = 3 | 0.2196       | 0.2030                           | 0.1988                         | 1.105   |

As a result, if Df is at least 0.22 mm when Nf=3, or if Df is at least 0.25 mm when Nf=2, the pressure loss will be smaller at the first communicating hole on the large-diameter portion side than at the second communicating hole on the sleeve side, so leakage of the lubricating fluid from the second communicating hole on the sleeve side is suppressed.

However, as can be seen from the above results, the difference between the maximum and minimum values obtained from the three Relational Formulas 17, 19, and 21 is on the order of about 10%, and it is not necessarily required to satisfy all three of these relational formulas, and for practical purposes satisfying any one of these should be adequate. Naturally, all of them may be satisfied.

Also, when Ds=0.4 mm, Ns=1, Ls=6.5 mm, and Lf=0.6 mm, for example, the equivalent diameter Df found from the above-mentioned Relational Formulas 17, 19, and 21 was found for when Nf=2 and 3. These results are shown in TABLE 2.

As a result, if Df is at least 0.17 mm when Nf=3, or if Df is at least 0.19 mm when Nf=2, the pressure loss will be smaller at the first communicating hole on the large-diameter portion side than at the second communicating hole on the sleeve side, so leakage of the lubricating fluid from the second communicating hole on the sleeve side is suppressed.

However, as can be seen from the above results, the difference between the maximum and minimum values obtained from the three Relational Formulas 17, 19, and 21 is on the order of less than 5%, and it is not necessarily required to satisfy all three of these relational formulas, and for practical purposes satisfying any one of these should be adequate. Naturally, all of them may be satisfied.

The hydrodynamic bearing device pertaining to the third invention is the hydrodynamic bearing device pertaining to the first invention, wherein the first communicating hole opens near the outer peripheral face of the main portion.

Here, because the first communicating hole opens near the outer peripheral face of the main portion, the first communicating hole opens into the clearance in the bearing portion supporting the shaft in the rotational direction above another face of the large-diameter portion.

This means that even if the clearance between the upper face of the large-diameter portion and the sleeve should be blocked off when the sleeve and the large-diameter portion of the shaft come into contact, the lubricating fluid can still flow to one end side of the shaft through the first communicating hole. Therefore, negative pressure is even less likely to be generated inside the bearing portion.

The phrase "near the outer peripheral face of the main portion" here encompasses a case in which the first communicating hole opens onto the outer peripheral face itself. Furthermore, as shown in FIG. 14, if we let D1 be the outside diameter of a main portion 31a and D2 be the outside diameter of a flange 31b, the outer peripheral position of the first communicating hole 31e (point X in the drawing) encompasses a case of being within (D1+D2)/2 as the pitch circle diameter.

The hydrodynamic bearing device pertaining to the fourth invention is the hydrodynamic bearing device pertaining to the first invention, further comprising a bubble suppression portion formed recessed in the flange cover and/or one end of the shaft.

Here, a bubble suppression portion is formed recessed in the flange cover and/or one end of the shaft.

Furthermore, when a bubble suppression portion is formed in the shaft, and the main portion and the large-diameter portion of the shaft are formed integrally, the bubble suppression portion may be provided at one end of the main portion and only within the outer diameter range of the main portion, but may instead be formed in a size that reaches all the way to a region that overlaps the large-diameter portion. If the main portion and large-diameter portion of the shaft are separate, one end of the main portion may be disposed recessed from the large-diameter portion to form the bubble suppression portion, or one end of the main portion may be formed with a smaller diameter, a flange-like member or the like with a large diameter fixed to this small-diameter portion, and the end of the small-diameter portion disposed recessed from the flange member or the like to form the bubble suppression portion. Furthermore, the bubble suppression portion may be extended all the way to around the small-diameter portion at one face of the large-diameter portion.

The large-diameter portion of the shaft may be the flange part that constitutes the portion supporting the bearing portion in the axial direction, or may be the retainer part that keeps the shaft from coming loose from the sleeve.

Here, since the bubble suppression portion is formed as a recess, there is a larger clearance in the space between the flange cover and sleeve and the periphery of the large-diameter portion, which makes it easier for the lubricating fluid to move. Specifically, even if a large impact is applied, the lubricating fluid will readily flow in from the outer periphery of the flange part. As a result, the generation of negative pressure at the flange part is suppressed. Further, the clearance of the bubble suppression portion may be equal to or greater than the depth of a thrust hydrodynamic groove. Providing the bubble suppression portion also increases the volume of the lubricating fluid that fills this portion. Accordingly, even if the volume of the above-mentioned space increases by an amount corresponding to the amount of rise of the main portion as the shaft moves up or down, the proportional increase versus the space as a whole will be small, and the lubricating fluid will tend not to be affected by an increase in volume.

Furthermore, since the other face of the large-diameter portion and the one face of the large-diameter portion where the bubble suppression portion is disposed communicate through the first communicating hole, the lubricating fluid is able to flow into the bubble suppression portion even more easily.

Therefore, when the hydrodynamic bearing device is subjected to impact or vibration, causing the shaft and sleeve to move suddenly up or down relative to each other, even if the clearance between the upper face of the large-diameter portion and the sleeve should be eliminated when the sleeve and the large-diameter portion of the shaft come into contact, negative pressure will be even less likely to be generated inside the bearing portion. As a result, it is possible to prevent problems such as leakage of the lubricating fluid that would otherwise be caused by the generation of bubbles in the lubricating fluid that fills the inside of the bearing portion, and to further improve the durability and performance of the hydrodynamic bearing device.

The hydrodynamic bearing device pertaining to the fifth invention is the hydrodynamic bearing device pertaining to the fourth invention, wherein the bubble suppression portion is formed at one end of the shaft.

Here, the bubble suppression portion is formed at one end of the shaft where negative pressure is likely to be formed and where a hydrodynamic groove for support in the axial direction is often formed.

This makes it possible to provide the bubble suppression portion easily at the end face of the shaft by lathe turning or the like. Also, when a thrust hydrodynamic groove is formed by coining in a shaft in which the large-diameter portion and the main portion are integral, the bubble suppression portion can be formed at the same time. Furthermore, if the bubble suppression portion is formed recessed on the flange cover side, when strength is taken into account, the thickness of the flange cover must be increased according to the recessed depth of the bubble suppression portion, which makes it difficult to achieve a product that is compact, thin, and lightweight. However, if the bubble suppression portion is provided at one end of the shaft, strength problems will be less likely to occur, so the flange cover can be thinner, and the axial length of the radial bearing portion can be increased correspondingly. As a result, the bearing stiffness of the radial bearing portion can be raised, and this reduces motor runout.

The hydrodynamic bearing device pertaining to the sixth invention is the hydrodynamic bearing device pertaining to the fourth invention, wherein the first communicating hole communicates with the bubble suppression portion.

Here, the effect of having the first communicating hole communicate with the bubble suppression portion is that even if the shaft should suddenly rise relative to the sleeve, so that the clearance between the upper face of the large-diameter portion and the sleeve is eliminated when the sleeve and the large-diameter portion of the shaft come into contact, the lubricating fluid can still be supplied directly from the first communicating hole to the bubble suppression portion. Accordingly, the generation of negative pressure in the middle portion of the shaft is more effectively prevented.

When the first communicating hole is made to communicate with the bubble suppression portion, the first communicating hole may communicate directly with the bubble suppression portion, but even if the first communicating hole opens onto a face of the large-diameter portion where the bubble suppression portion is not formed, a groove or the like may be formed in the shaft or flange cover from the open portion of the first communicating hole toward the bubble suppression portion, and the first communicating hole and the bubble suppression portion may communicate by means of this groove.

The hydrodynamic bearing device pertaining to the seventh invention is the hydrodynamic bearing device pertaining to the first invention, wherein the large-diameter portion of the shaft is formed integrally with the main portion.

Here, the effect of having the main portion of the shaft and the large-diameter portion formed integrally is that the shaft can be produced more easily, by forging, sintering, die casting, or another such forming technique. As a result, the shape and dimensional precision of the first communicating hole can be enhanced, and productivity and yield can be improved. Also, even if the hydrodynamic bearing device should be subjected to a large impact, there will be less large-diameter portion deformation in relation to the main portion.

The hydrodynamic bearing device pertaining to the eighth invention is the hydrodynamic bearing device pertaining to the first invention, wherein the large-diameter portion is separate from the main portion and is fixed to the main portion.

Here, the shaft is made up of two members, namely, a main portion and a large-diameter portion that is fixed to the outer peripheral face or the bottom face, for example, of the main portion.

The effect of this is that merely by disposing one end of the main portion recessed with respect to the large-diameter portion, the bubble suppression portion formed recessed at one end of the shaft can be formed simply, without performing any pressing or other such machining. Also, the first communicating hole can be simply formed merely by forming in the axial direction a groove that is recessed in the outer peripheral face of the main portion or in the inner peripheral face of the large-diameter portion, so the first communicating hole is easier to form.

The spindle motor pertaining to the ninth invention is comprises a stationary member, a rotary member, and the hydrodynamic bearing device pertaining to the first invention. The stationary member has a base and a stator that is fixed to the base. The rotary member has a rotor magnet that is disposed opposing to the stator and constitutes a magnetic circuit along with the stator, and a hub that fixes the rotor magnet. The hydrodynamic bearing device is fixed to the base and supports the rotary member rotatably with respect to the stationary member.

With this spindle motor, durability and reliability can be improved even when the motor is used under conditions of being subjected to a large impact.

The recording and reproducing apparatus pertaining to the tenth invention comprises the spindle motor pertaining to the ninth invention and information access portion. The information access portion is fixed to the hub, and writes or reads information to or from the required location on a recording medium on which information can be recorded.

With this recording and reproducing apparatus, durability and reliability can be improved even when the apparatus is used under conditions of being subjected to a large impact.

With the hydrodynamic bearing device pertaining to the present invention, even if the hydrodynamic bearing device should be subjected to impact or vibration, so that the shaft and sleeve violently move up or down relative to one another, the lubricating fluid will flow from the first communicating hole to the middle part of the shaft, and negative pressure will tend not to be generated in the lubricating fluid. Also, even if the shaft should subsequently drop suddenly with respect to the sleeve, the lubricating fluid will flow from the first communicating hole to another face of the large-diameter portion. As a result, lubricating fluid is less likely to flow to the second communicating hole during up or down movement, and pressure pulsation is attenuated in the second communicating hole. This prevents such problems as leakage of the lubricating fluid caused by the generation of bubbles in the lubricating fluid filling the inside of the bearing portion, and improves the durability and reliability of the hydrodynamic bearing device.

DETAILED DESCRIPTION OF THE INVENTION

A spindle motor 1 in which a hydrodynamic bearing device 30 pertaining to an embodiment of the present invention is installed will be described through reference to FIGS. 2 to 4.

In the following description, the up and down direction in FIG. 2 will be referred to as the "axial direction," the up direction as the "upward axial direction," and the down direction as the "downward axial direction," but these are not intended to limit the actual attachment directions of the hydrodynamic bearing device 30.

Overall Configuration of Spindle Motor 1

Figure 1:
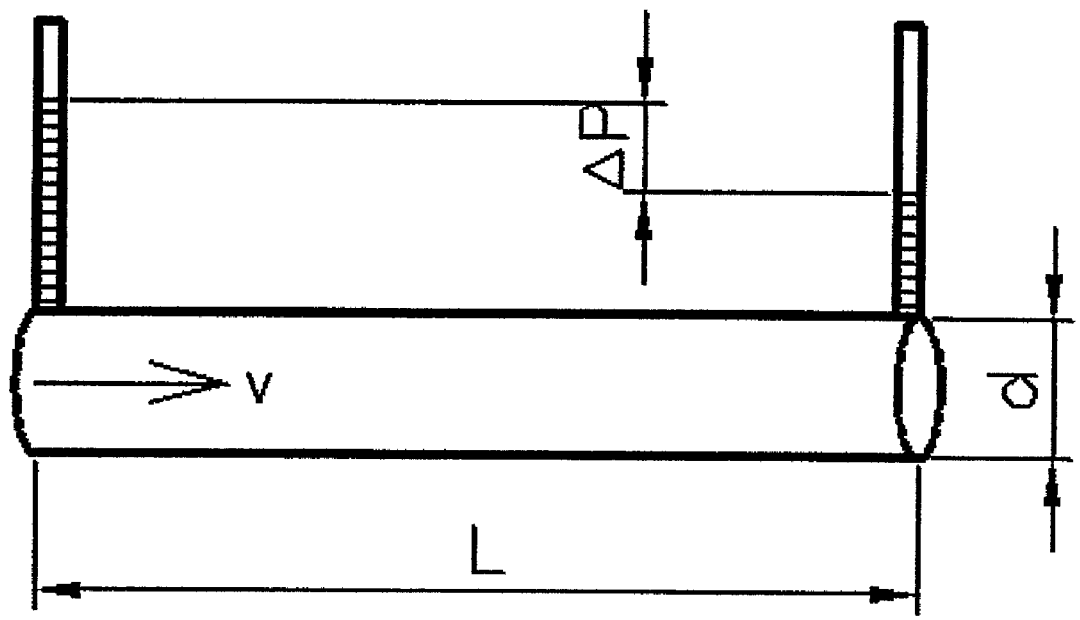
FIG. 1 is a schematic diagram illustrating pressure loss in the present invention.
Figure 2:
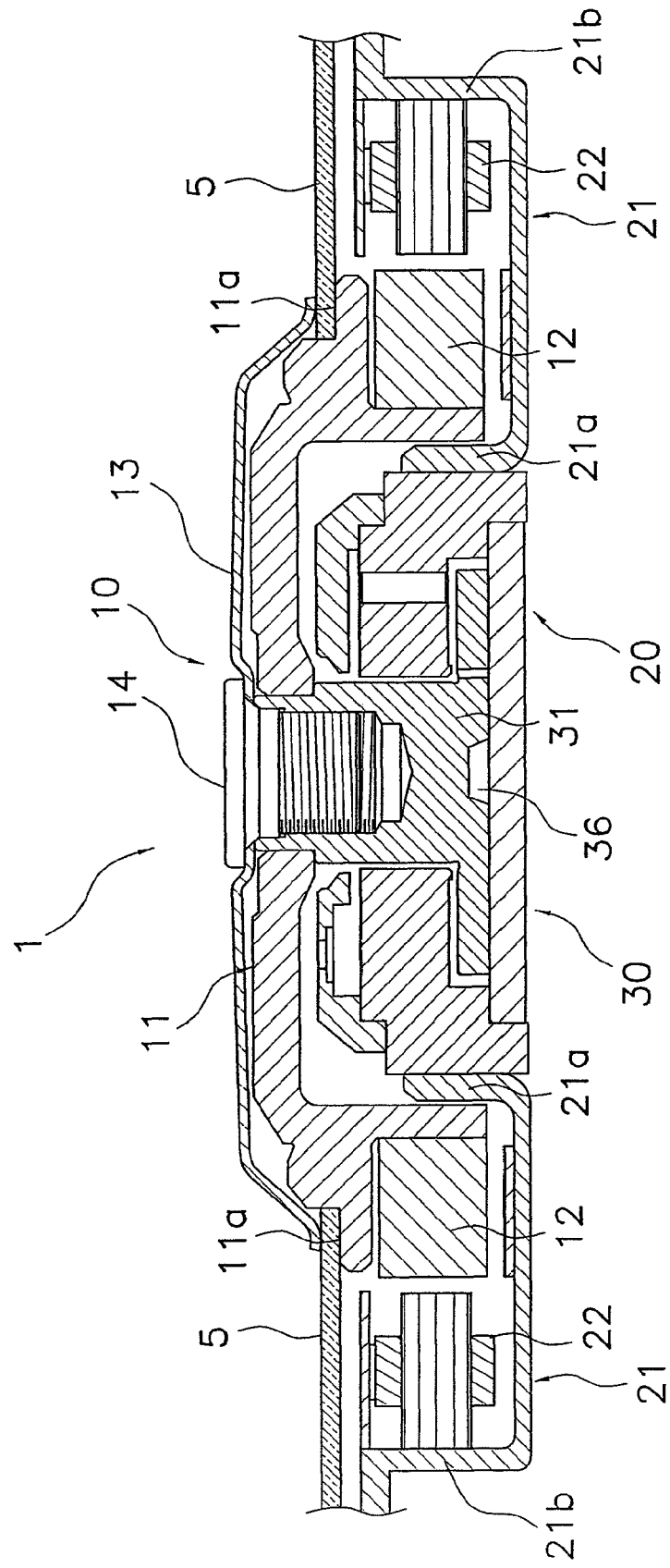
FIG. 2 is a cross section of a spindle motor including a hydrodynamic bearing device pertaining to an embodiment of the present invention.

As shown in FIG. 2, the spindle motor 1 pertaining to an embodiment of the present invention is an apparatus for rotationally driving a recording disk (recording medium) 5, and mainly comprises a rotary member 10, a stationary member 20, and the hydrodynamic bearing device 30 pertaining to the first embodiment.

The rotary member 10 mainly has a hub 11 on which the recording disk 5 is mounted, and a rotor magnet 12.

The hub 11 is made of stainless steel, for example, which is an iron-based metal material (such as martensite- or ferrite-based stainless steel, such as DHS1 made by Daido Steel), and is integrated with a shaft 31 by press-fitting, adhesive bonding, welding, or the like with respect to the shaft 31. Also, the hub 11 has a disk placement portion 11a, on which the recording disk 5 is placed, formed integrally around its outer periphery.

The rotor magnet 12 is fixed to the outer peripheral face of the hub 11, and constitutes a magnetic circuit along with a stator 22 (discussed below). The rotor magnet 12 is composed of a magnet material with a high energy product, such as a neodymium-iron-boron-based resin magnet, and its surface is coated with an epoxy resin, plated with nickel, or otherwise treated, which rust-proofing and prevents chipping.

The recording disk 5 is placed over the disk placement portion 11a, pressed in the downward axial direction by, for example, a clamper 13 fixed by a fixing bolt 14 to the shaft 31

(discussed below), and clamped between the clamper 13 and the disk placement portion 11a.

The stationary member 20, as shown in FIG. 2, mainly comprises a base 21 and a stator 22 that is fixed to the base 21.

The base 21 also serves as a housing for the recording and reproducing apparatus, and has a first base portion 21a that serves as a pedestal for the hydrodynamic bearing device 30 (discussed below), and a second base portion 21b for attaching the stator 22. The base 21 is made of an iron-based metal material or an aluminum-based metal material.

The stator 22 is fixed to the second base portion 21b, and is disposed opposing to the rotor magnet 12. The stator core of the stator 22 is formed by laminating silicon steel sheets in a thickness of 0.15 to 0.20 mm.

Detailed Configuration, Etc., of Hydrodynamic Bearing Device 30

As shown in FIG. 2, the hydrodynamic bearing device 30 is fixed in an opening formed substantially in the middle part of the base 21, and supports the rotary member 10 rotatably with respect to the stationary member 20. As shown in FIG. 3, the hydrodynamic bearing device 30 mainly comprises a sleeve 32, a shaft 31 disposed in the sleeve 32, a flange cover 33, and oil 34 (the lubricating fluid). The hydrodynamic bearing device 30 further comprises a bearing portion 35 that supports the shaft 31 and the sleeve 32 so as to allow relative rotation, a bubble suppression portion 36 that suppresses the generation of bubbles at the lower end (one end) of the shaft 31, and a taper seal 37. Of these, in this embodiment, the sleeve 32 and flange cover 33 constitute the stationary member 20, and the shaft 31 constitutes the rotary member 10.

The sleeve 32 is, for example, a substantially cylindrical member having a bearing hole (an example of the insertion hole) 32d that extends in the axial direction and is made from pure iron, stainless steel, a copper alloy, sintered metal, or the like, and is fixed to the base 21. The sleeve 32 is constituted by a sleeve main portion 32a disposed opposing to the outer peripheral side of the shaft 31, and a sleeve cap 32b disposed opposing to the upper part of the shaft 31. At least one communicating hole (an example of the second communicating hole) 32c that communicates between the top face and the bottom face is formed in the sleeve main portion 32a. In this embodiment, just one (Ns=1) communicating hole 32c is disposed opposing to the top face of the flange 31b of the shaft 31 (discussed below). The diameter Ds of the communicating hole 32c is, for example, about 0.4 mm, and the length Ls is, for example, about 6.5 mm. The bearing hole 32d is a stepped, cylindrical hole constituted by two (one large and one small) cylinders. The sleeve cap 32b is a member that has a roughly inverted dish shape, and is a member that forms an oil reservoir 32e and a bubble release 32f. The communicating hole 32c is a hole for communication between the top and bottom faces of the sleeve main portion 32a, and is provided to equalize the pressure by circulating the oil 34.

The shaft 31 is a flanged, cylindrical member that extends in the axial direction and is made from stainless steel, which is an iron-based metal material (such as SUS303 or another austenite-based stainless steel martensite, or such as ASK8000 (made by Akiyama Seiko) or another which has a higher manganese content than ordinary austenite-based stainless steel, or such as SUS420 or another martensite-based stainless steel), a ceramic, or the like. The shaft 31 is inserted into the bearing hole 32d of the sleeve 32. More specifically, the shaft 31 is disposed in a state of being able to rotate relative to the sleeve 32 and the flange cover 33, with a clearance in between. The shaft 31 has a cylindrical main portion 31a and a flange 31b (an example of the large-diameter portion) that is fixed to the lower end (one end) of the main portion 31a. A hub mounting portion 31c that is formed in a smaller diameter is formed at the upper end (the other end) of the main portion 31a. A threaded hole 31d into which the fixing bolt 14 is threaded is formed in the upper end face. As shown in FIG. 2, the hub 11 is fixed to the outer peripheral face of the hub mounting portion 31c by press-fitting, adhesive bonding, laser welding, or another suitable fixing means, and is constructed to rotate along with the shaft 31. The middle part of the lower end face of the shaft 31 is recessed. This recessed portion serves as the bubble suppression portion 36. The bubble suppression portion 36 in this embodiment is formed in a smaller diameter than the main portion 31a.

Furthermore, in this embodiment the bubble suppression portion is formed as a recess in the shaft 31, but may instead be formed as a recess in the flange cover 33. It may also be formed as a recess in both the shaft 31 and the flange cover 33.

Figure 3:
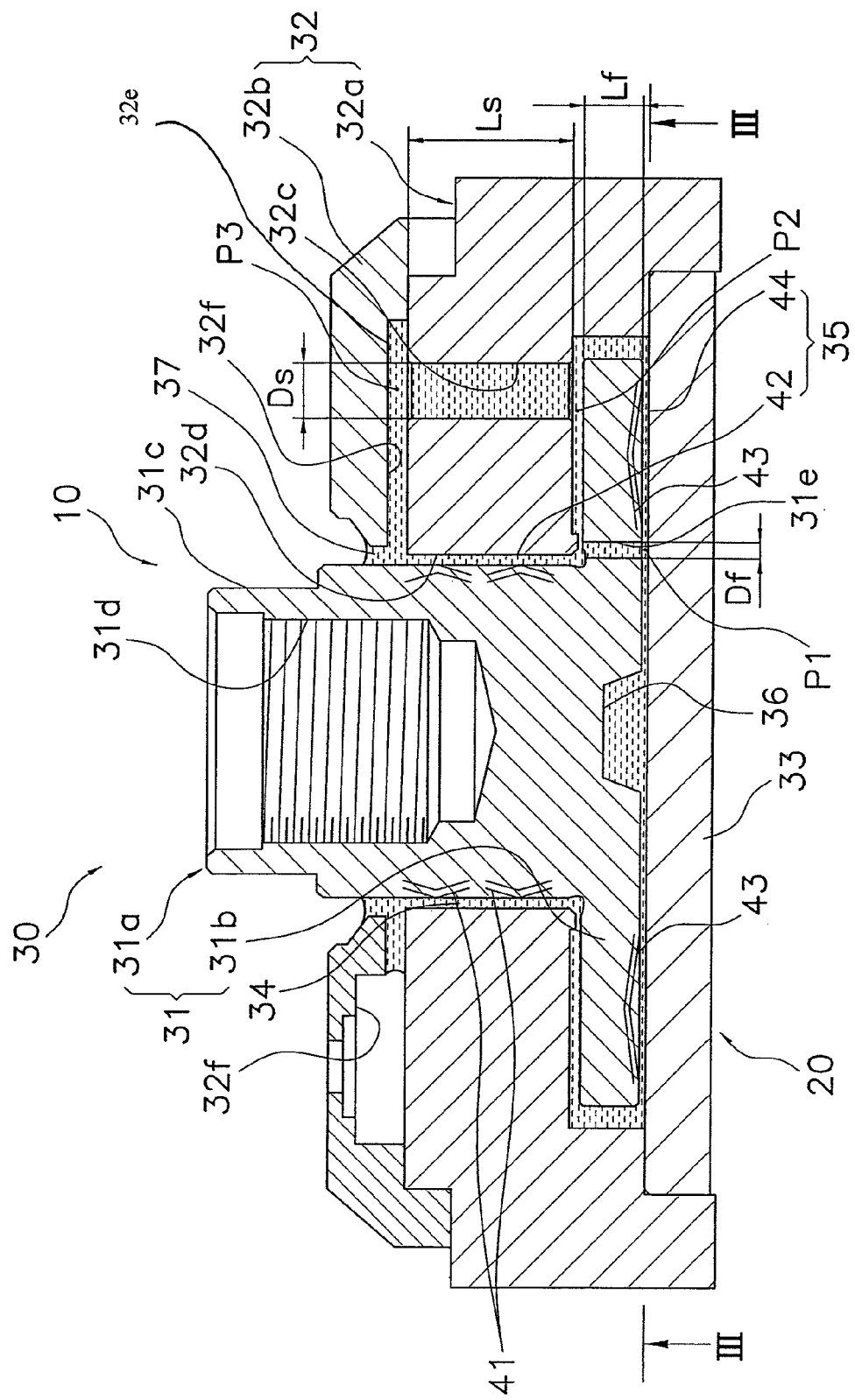
FIG. 3 is a detail cross section of the hydrodynamic bearing device included in FIG. 2.
Figure 4:
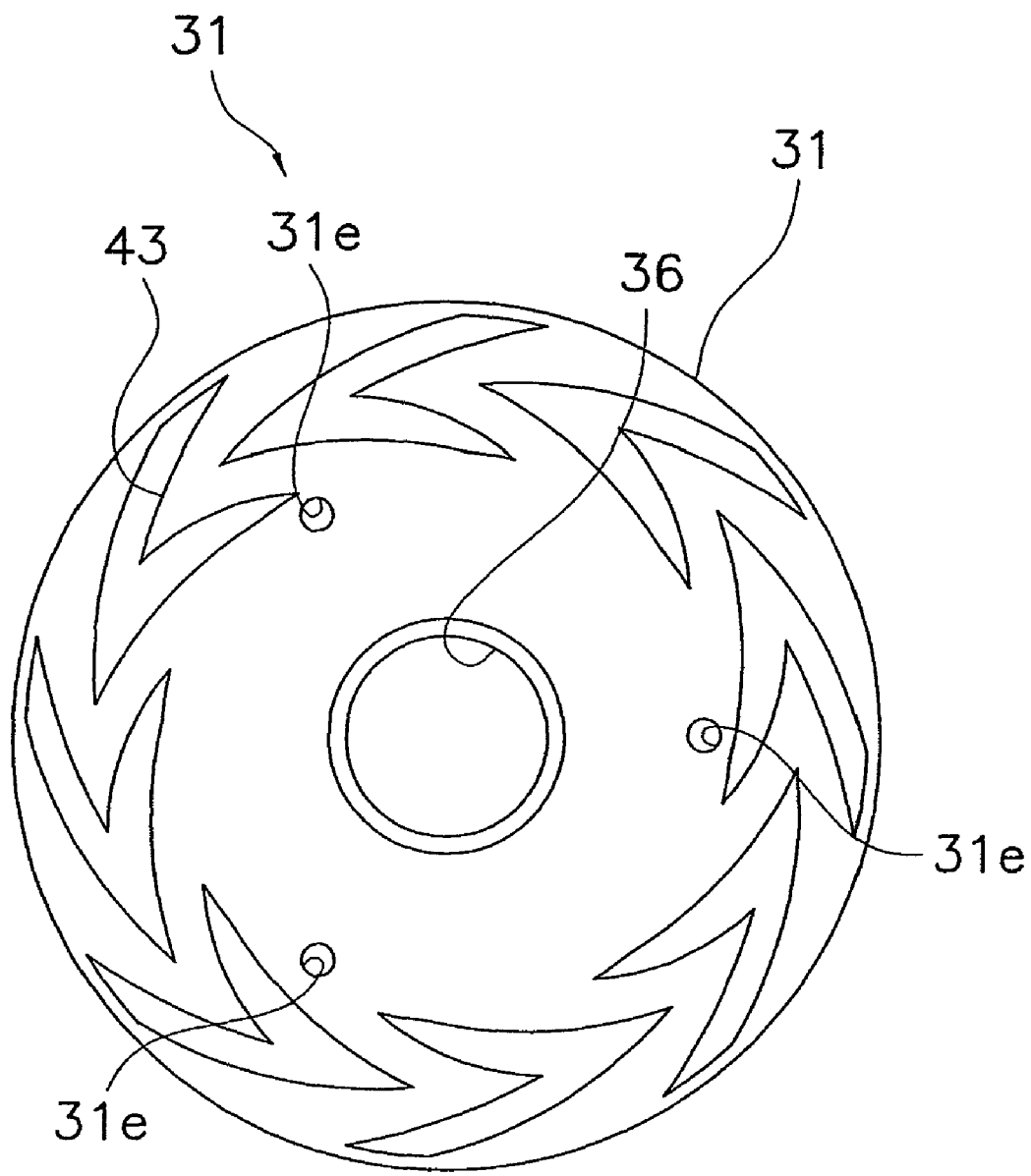
FIG. 4 is a bottom view of the lower face of the shaft along the III-III line in FIG. 3.

As shown in FIGS. 2, 3, 4, and elsewhere, the various bubble suppression portions are preferably formed in axial symmetry. This keeps the lubricating fluid from being agitated in the bubble suppression portion and allows the generation of bubbles to be suppressed more effectively. Furthermore, when the flange is fixed to the main portion of the shaft by laser welding or the like, a small amount of roughening occurs at the welds, but as long as the maximum height of the surface roughness is sufficiently less than the thickness of the bubble suppression portion (such as 50 microns or less), the surface may be safely considered smooth for the purposes of fluid dynamics, and roughness produced by laser welding is not believed to affect axial symmetry.

Figure 6:
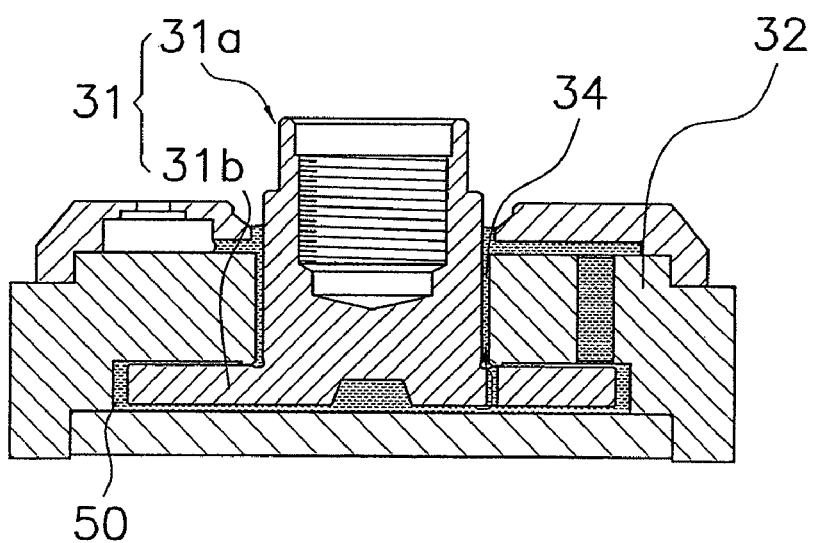
FIG. 6 is a detail cross section of the hydrodynamic bearing device when the shaft has been disposed at its upper end position.

The flange 31b is formed integrally with the main portion 31a. At least one communicating hole (an example of the first communicating hole) 31e is formed at a location on the flange 31b that is close to the outer peripheral face of the main portion 31a. As shown in FIG. 6, three of the communicating holes 31e in this embodiment are formed spaced apart in the circumferential direction.

The communicating hole 31e is formed so as to communicate between the upper and lower end faces of the flange 31b. In this embodiment, since the diameter of the bubble suppression portion 36 is smaller than the diameter of the main portion 31a, the communicating hole 31e does not communicate directly with the bubble suppression portion 36. The diameter Df of the communicating hole 31e is, for example, about 0.2 mm, and the length Ls is, for example, about 0.6 mm. This is greater than the 0.1675 mm that is the maximum value of the calculation results in Table 2 3 mentioned above.

TABLE 2

| | | Laminar flow | Turbulent flow (smooth surface) | Turbulent flow (rough surface) | Max/Min |
|---|---|---|---|---|---|
| Df | Nf = 2 | 0.1854 | 0.1876 | 0.1882 | 1.015 |
| | Nf = 3 | 0.1675 | 0.1616 | 0.1601 | 1.047 |

This satisfies the conditions for all of the constants n and m in Relational Formula 1, and the absolute value of the difference between the pressure P1 at one end of the communicating hole 31e on the flange 31b side and the pressure P2 at the other end is smaller than the absolute value of the difference between the pressure P3 at one end of the communicating hole 32c on the sleeve 32 side and the pressure P2 at the other end, or in other words, the pressure loss at the communicating hole 31e on the flange 31b side is smaller than the pressure loss at the communicating hole 32c on the sleeve 32 side, and the oil 34 can pass through the communicating hole 31e on the flange 31b side more easily than through the communicating hole 32c on the sleeve 32 side.

Accordingly, even if the hydrodynamic bearing device 30 should be subjected to impact or vibration, so that the shaft 31 and sleeve 32 violently move up or down relative to one another, the oil 34 will flow from the communicating hole 31e to the lower end of the shaft 31, and negative pressure will tend not to be generated in the oil 34. Also, even if the shaft 31 should subsequently drop suddenly with respect to the sleeve 32, the oil 34 will flow from the communicating hole 31e to the upper face of the flange 31b. As a result, the oil 34 is less likely to flow to the communicating hole 32c on the sleeve 32 side during up or down movement, and pressure pulsation is attenuated in the communicating hole 32c. This prevents such problems as leakage of the oil 34 caused by the generation of bubbles in the oil 34 filling the inside of the bearing portion, and improves the durability and reliability of the hydrodynamic bearing device 30.

As shown in FIG. 3, the flange cover 33 is a disk-shaped member made from stainless steel (such as SUS420) or cemented carbide steel (such as FB10), which are iron-based metal materials. The flange cover 33 is disposed within the sleeve main portion 32a so as to block off the substantially circular opening formed at the end in the downward axial direction of the bearing hole 32d in the sleeve main portion 32a.

The various components constituted by the stationary member 20 and the rotary member 10 will now be described.

A herringbone-shaped radial hydrodynamic groove (hydrodynamic groove) 41, which is known in this field of technology, is provided to the outer peripheral face of the main portion 31a, and a herringbone-shaped thrust hydrodynamic groove 43 is provided to the lower face of the flange 31b (the face opposing to the flange cover 33). Accordingly, in between the sleeve 32 and the main portion 31a of the shaft 31 is formed a radial bearing portion 42 that includes the radial hydrodynamic groove 41 that supports the shaft 31 and the sleeve 32 relatively rotatably in the rotation direction. Also, in between the flange cover 33 and the flange 31b of the shaft 31 is formed a thrust bearing portion 44 that includes the thrust hydrodynamic groove 43 that supports the shaft 31 and the sleeve 32 relatively rotatably in the axial direction. The radial bearing portion 42 and the thrust bearing portion 44 constitute the bearing portion 35.

Since the thrust hydrodynamic groove 43 has a herringbone pattern in the thrust bearing portion 44 here, there is less likely to be a pressure differential between the upper and lower faces of the flange 31b, and the float balance is less likely to be lost than with a spiral pattern.

The taper seal 37 is a clearance formed by the outer peripheral face below the hub mounting portion 31c of the main portion 31a of the shaft 31, and the inner peripheral face of the sleeve cap 32b. The clearance that is the taper seal 37 grows in the outward axial direction, and the end in the outward axial direction is exposed to the atmosphere. In this embodiment, the inner peripheral face of the sleeve cap 32b has a tapered structure, which is what creates the shape in which the clearance grows in the outward axial direction. This makes it possible to hold the oil 34 by capillary action.

The oil 34 fills the communicating holes 32c and 31e and the clearance formed between the flange cover 33 and the sleeve 32 and shaft 31, including the thrust bearing portion 44 and the radial bearing portion 42. A low-viscosity ester oil, an ionic liquid, or the like can be used, for example, as the oil 34.

As discussed above, the hydrodynamic bearing device 30 is a flange shaft type constituted by the bearing portion 35 including the thrust bearing portion 44 and the radial bearing portion 42.

Operation of Spindle Motor 1

The operation of the spindle motor 1 will now be described through reference to FIGS. 2 and 3.

When power is switched on to the stator 22 in the spindle motor 1, a rotary magnetic field is generated and rotational force is imparted to the rotor magnet 12. This allows the rotary member 10 to be rotated along with the shaft 31, with the shaft 31 serving as the middle of rotation.

When the shaft 31 rotates, support pressure is generated in the radial and axial directions in the hydrodynamic grooves 41 and 43. As a result, the shaft 31 is supported without coming into contact with the sleeve 32. That is, the rotary member 10 is able to rotate in a non-contact state with respect to the stationary member 20, and this allows the recording disk 5 to rotate at high speed and precision.

Action During Up or Down Motion of the Shaft 31

Figure 5:
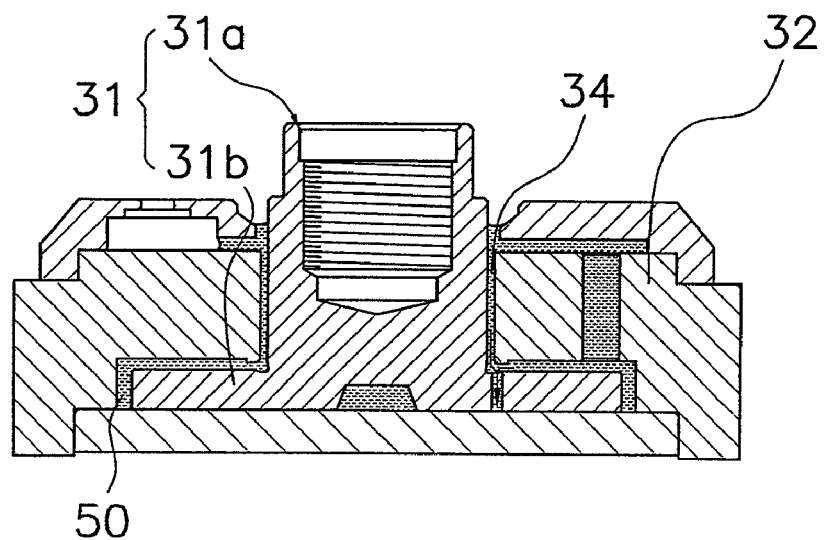
FIG. 5 is a detail cross section of the hydrodynamic bearing device when the shaft has been disposed at its lower end position.

When the shaft 31 is disposed at its bottom position (as shown in FIG. 5) while not rotating, the communicating hole 31e allows the oil 34 to flow between the radial bearing portion 42 and the upper face of the flange 31b and the lower face of the flange 31b.

When the shaft 31 rises to its top position (as shown in FIG. 6) from its bottom position (shown in FIG. 5), a space 50 between the flange cover 33 and the sleeve 32 and the periphery of the flange 31b increases according to the volume by which the main portion 31a of the shaft 31 has risen. If the shaft 31 should suddenly rise due to an impact caused by a fall or the like, the clearance between the sleeve 32 and the upper face of the flange 31b is instantly blocked off, and the oil 34 has difficulty flowing into the space 50 from the outer peripheral side of the flange 31b. As a result, the volume of the oil 34 decreases below that of the space 50, negative pressure is generated at the lower end face of the shaft 31, and bubbles attempt to form. With this embodiment, however, the communicating hole 31e is formed passing through the upper and lower faces of the flange 31b. This communicating hole 31e is formed so that the pressure loss will be smaller than at the communicating hole 32c on the sleeve 32 side. Therefore, the oil 34 is less likely to flow through the communicating hole 32c, and the oil 34 is supplied not only from the outer peripheral side of the flange 31b, but also from the communicating hole 31e into the space 50 as indicated by the arrow. As a result, a large negative pressure is less likely to be generated within the space 50, and bubbles are less likely to form.

Furthermore, since the communicating hole 31e opens near the outer peripheral face of the main portion 31a, even in a state in which the upper face of the flange 31b and the sleeve 32 are closed off, the space 50 will still communicate with the upper face of the flange 31b. This means that the oil 34 can be supplied to the space 50 even if the sleeve 32 and the flange 31b are in contact.

Also, since the bubble suppression portion 36 is formed recessed in the lower face of the flange 31b, the volume of the space 50 is larger, and the volume of the oil 34 held therein is also larger. Therefore, even if the volume of the space 50 increases by an amount corresponding to the rise of the main portion 31a as the shaft 31 moves up or down, the proportional increase versus the space 50 as a whole will be small, and the oil 34 will tend not to be affected by an increase in volume. The result is that negative pressure is even less likely to be generated in the oil 34.

Also, the oil 34 will flow from the communicating hole 31e to the upper face of the flange 31b, as indicated by the arrow, even when the shaft 31 drops suddenly from the upper end position shown in FIG. 6 relative to the lower end position shown in FIG. 5. As a result, the oil 34 is less likely to flow to the communicating hole 32c during up or down motion, and pressure pulsation is attenuated in the communicating hole 32c. This prevents such problems as leakage of the oil 34 caused by the generation of bubbles in the oil 34 filling the inside of the bearing portion, and improves the durability and reliability of the hydrodynamic bearing device 30.

Features of the Hydrodynamic Bearing Device 30

(1) With the hydrodynamic bearing device 30 of this embodiment, as shown in FIGS. 3 and 4, at least one communicating hole 31e and at least communicating hole 32c are provided to the flange 31b and the sleeve 32, respectively, and the shape and number of these communicating holes are determined so that at least the pressure loss between both ends of the communicating hole 31e will be smaller than the pressure loss between both ends of the communicating hole 32c.

Here, since the pressure loss between both ends is smaller for the communicating hole 31e provided to the flange 31b of the shaft 31 than for the communicating hole 32c provided to the sleeve 32, the oil 34 flows more readily to the communicating hole 31e than to the communicating hole 32c. Accordingly, even if the shaft 31 should rise suddenly with respect to the sleeve 32 away from the flange cover 33, the oil 34 located on the opening side of the bearing hole 32d from the flange 31b, that is, above the flange 31b, will flow less readily through the communicating hole 32c, and will flow more readily through the communicating hole 31e to the lower end side of the shaft 31 where negative pressure tends to be generated.

Accordingly, if the hydrodynamic bearing device 30 should be subjected to impact or vibration so that the shaft 31 and sleeve 32 violently move up or down relative to one another, then even if the clearance between the upper face of the flange and the sleeve 32 should be eliminated when the sleeve 32 and the flange 31b of the shaft 31 come into contact, the oil 34 can still flow from the communicating hole 31e to the lower end middle part of the shaft 31, so negative pressure is less likely to be generated in the oil 34. Also, if the shaft 31 should subsequently undergo a sudden drop relative to the sleeve 32, the oil 34 will flow from the communicating hole 31e to the upper face of the flange 31b. As a result, the oil 34 flows less readily to the communicating hole 32c during up or down movement, and pressure pulsation is attenuated in the communicating hole 32c. This prevents such problems as leakage of the oil 34 caused by the generation of bubbles in the oil 34 filling the inside of the bearing portion, and improves the durability and reliability of the hydrodynamic bearing device 30.

(2) The equivalent diameter (Df), length (Lf), and number (Nf) of the communicating hole 31e and the equivalent diameter (Ds), length (Ls), and number (Ns) of the communicating hole 32c satisfy the following Relational Formula 1:

$$\frac{Df}{Ds} > \sqrt[n]{\left(\frac{Ns}{Nf}\right)^m \left(\frac{Lf}{Ls}\right)} \quad (1)$$

the equivalent diameters Df and Ds of the communicating holes 31e and 32c are four times of the quotients obtained by dividing the cross sectional areas Af and As of the communicating holes 31e and 32c by the peripheral lengths Lf and Ls, respectively, as expressed by the following Relational Formula 2:

$$Ds = 4\frac{As}{Ss}, \quad Df = 4\frac{Af}{Sf} \quad (2)$$

and the shapes (equivalent diameters Df and Ds) and lengths (Lf and Ls) and number (Nf and Ns) of the communicating holes 31e and 32c are determined such that the constants n and m in the Relational Formula 1 are numbers greater than or equal to 1, and the combination of the constants (n, m) satisfies at least one of (4, 1), (4.75, 1.75), and (5, 2).

The result of this is that the pressure loss at the communicating hole 31e is always smaller than the pressure loss at the communicating hole 32c.

Here, when the shaft 31 moves up or down relative to the sleeve 32, the oil 34 tries to move through the communicating hole 31e of the flange 31b and through the communicating hole 32c of the sleeve 32. When this happens, since the pressure loss at the point when the flow through the communicating hole 31e from upstream toward downstream is smaller than the pressure loss at the communicating hole 32c, the oil 34 will flow readily to one end of the shaft where negative pressure tends to be generated, and negative pressure will therefore be generated less readily.

In this case, as mentioned above, the oil 34 moves smoothly through the communicating hole 31e, so even if an impact should cause up or down movement, negative pressure will not be readily generated within the bearing portion, and bubbles will not form, so leakage of the oil 34 from the open side of the communicating hole 32c on the sleeve side can be effectively suppressed.

(3) The communicating hole 31e in the shaft 31 opens near the outer peripheral face of the main portion 31a.

The effect here of having the communicating hole 31e open near the outer peripheral face of the main portion 31a is that the communicating hole 31e opens into the clearance of the bearing portion 35 that rotatably supports the shaft 31 above the upper face of the flange 31b.

As a result, even if the clearance between the upper face of the flange 31b and the sleeve 32 should be blocked off when the sleeve 32 and the flange 31b of the shaft 31 come into contact, the oil 34 can still flow to the lower end side of the shaft 31 through the communicating hole 31e. Therefore, negative pressure is even less likely to be generated inside the bearing portion.

(4) The bubble suppression portion 36, which suppresses the generation of bubbles by preventing the generation of negative pressure, is formed recessed in the flange cover 33 and/or the lower end of the shaft 31.

Here, since the bubble suppression portion 36 is formed recessed in the flange cover 33 and/or the lower end of the shaft 31, the volume is greater for the space between the flange cover 33 and sleeve 32 and the periphery of the flange 31b, and the volume of the oil 34 accumulated therein also increases. Therefore, even if the volume of the space 50 increases by an amount corresponding to the amount of rise of the main portion 31a as the shaft 31 moves up or down, the proportional increase versus the space 50 as a whole will be small, and the oil 34 will tend not to be affected by an increase in volume.

Therefore, if the hydrodynamic bearing device 30 should be subjected to impact or vibration, causing the shaft 31 and sleeve 32 to move suddenly up or down relative to each other, negative pressure will be even less likely to be generated in the oil 34 at the lower end middle part of the shaft 31. As a result, it is possible to prevent problems such as leakage of the oil 34 that would otherwise be caused by the generation of bubbles in the oil 34 that fills the inside of the bearing portion, and to further improve the durability and performance of the hydrodynamic bearing device 30.

(5) The bubble suppression portion 36 is formed at the lower end of the shaft 31.

Here, the bubble suppression portion 36 is formed at the lower end of the shaft 31 where negative pressure is likely to be generated and where the thrust hydrodynamic groove 43 for support in the axial direction is often formed.

This makes it possible to provide the bubble suppression portion easily at the end face of the shaft by lathe turning or the like. Also, when a thrust hydrodynamic groove is formed by coining in a shaft in which the large-diameter portion and the main portion are integral, the bubble suppression portion can be formed at the same time. Furthermore, if the bubble suppression portion is formed recessed on the flange cover side, when strength is taken into account, the thickness of the flange cover must be increased according to the recessed depth of the bubble suppression portion, which makes it difficult to achieve a product that is compact, thin, and lightweight. However, if the bubble suppression portion is provided at one end of the shaft, strength problems will be less likely to occur, so the flange cover can be thinner, and the axial length of the radial bearing portion can be increased correspondingly. As a result, the bearing stiffness of the radial bearing portion t can be raised, and this reduces motor runout.

Other Embodiments

An embodiment of the present invention was described above, but the present invention is not limited to the above embodiment, and various modifications are possible without departing from the gist of the invention.

(A)

With the hydrodynamic bearing device 30 in the above embodiment, the communicating hole 31e and the bubble suppression portion 36 do not communicate with each other in the shaft 31, but the present invention is not limited to this configuration. For example, as shown in FIGS. 7 and 8, a radial communicating groove 138 may be formed on the lower face of a flange 131b of a shaft 131 of a hydrodynamic bearing device 130, so that a communicating hole 131e and a bubble suppression portion 136 communicate with each other.

When the bubble suppression portion 136 and the communicating hole 131e are thus made to communicate, even if the shaft 131 should rise suddenly relative to the sleeve 32, so that the flange 131b of the shaft 131 and the sleeve 32 come into contact, the oil 34 can still be supplied directly from the communicating hole 131e to the bubble suppression portion 136. Accordingly, the generation of negative pressure in the lower end middle portion of the shaft 131 is more effectively prevented. The communicating groove may also be formed radially or annularly in the flange cover 33, rather than the shaft 131.

Figure 7:
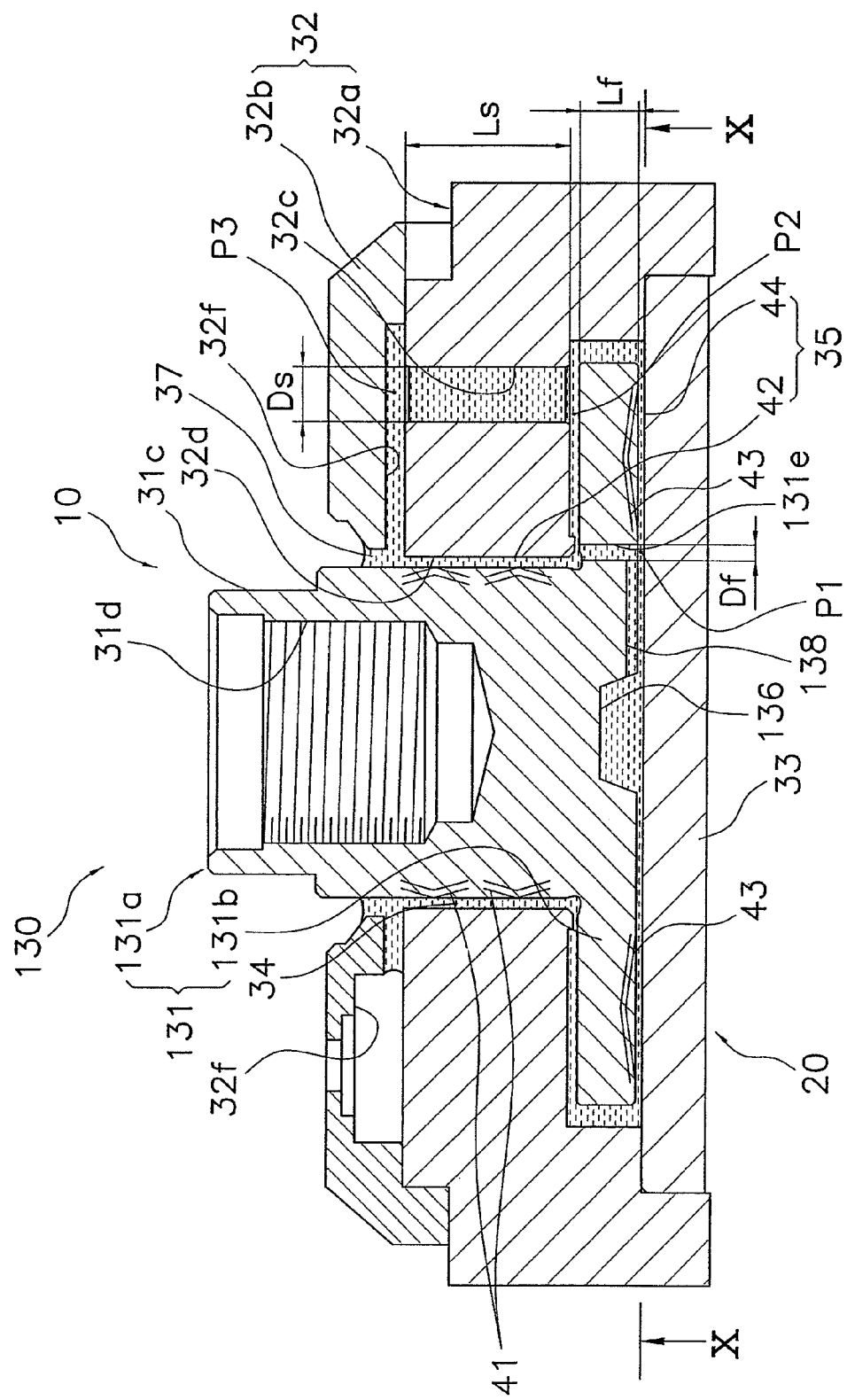
FIG. 7 is a cross section corresponding to FIG. 3 of the hydrodynamic bearing device pertaining to another embodiment of the present invention.
Figure 8:
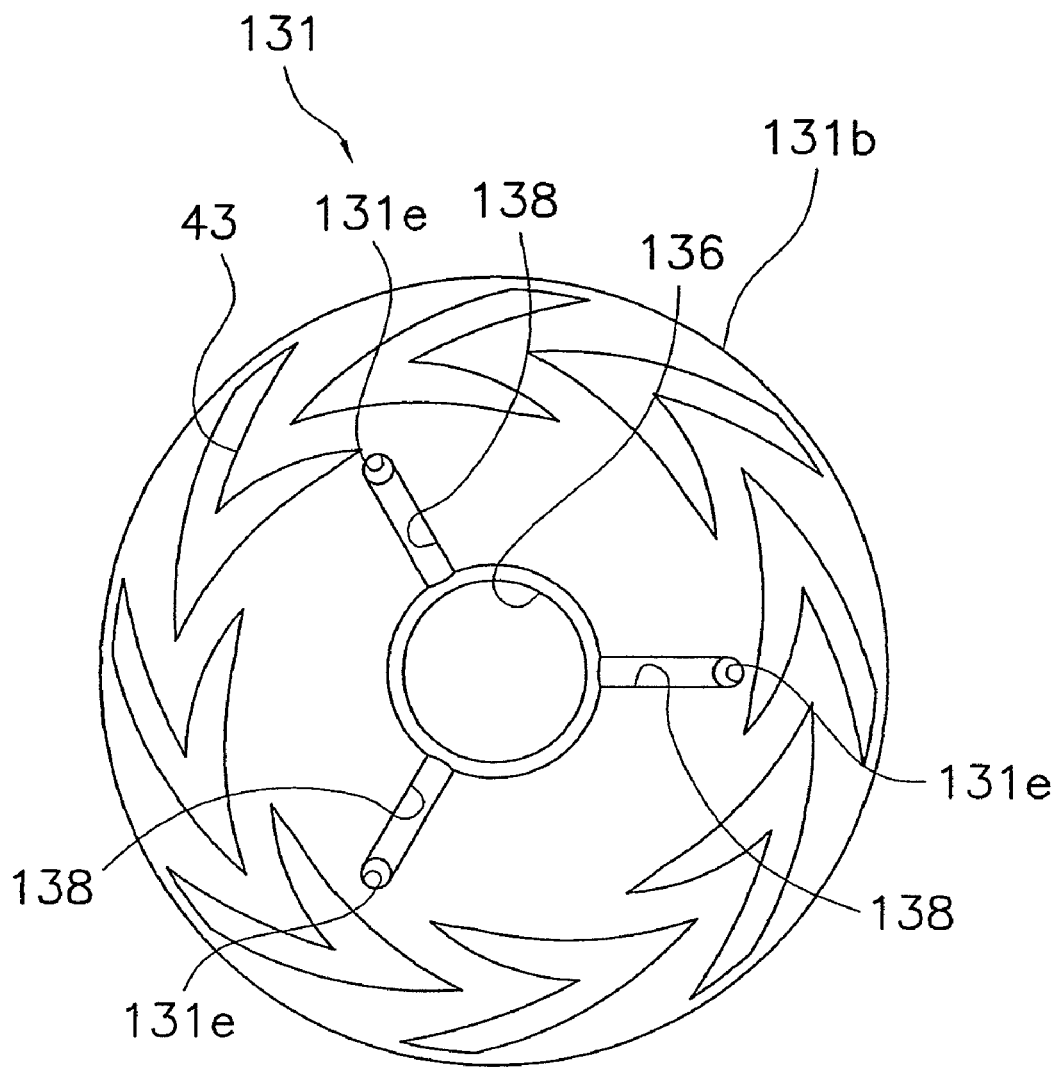
FIG. 8 is a bottom view corresponding to FIG. 4 of the lower face of the shaft along the X-X line in FIG. 7.

Furthermore, in FIG. 7, since the bubble suppression portion 136 is smaller in diameter than the main portion 31a, the bubble suppression portion 136 is not formed all the way to the communicating hole 31e that opens onto the outer peripheral face of the main portion 31a, and therefore the communicating groove 138 must be disposed radially in order for the bubble suppression portion 136 to communicate with the communicating hole 131e.

Figure 9:
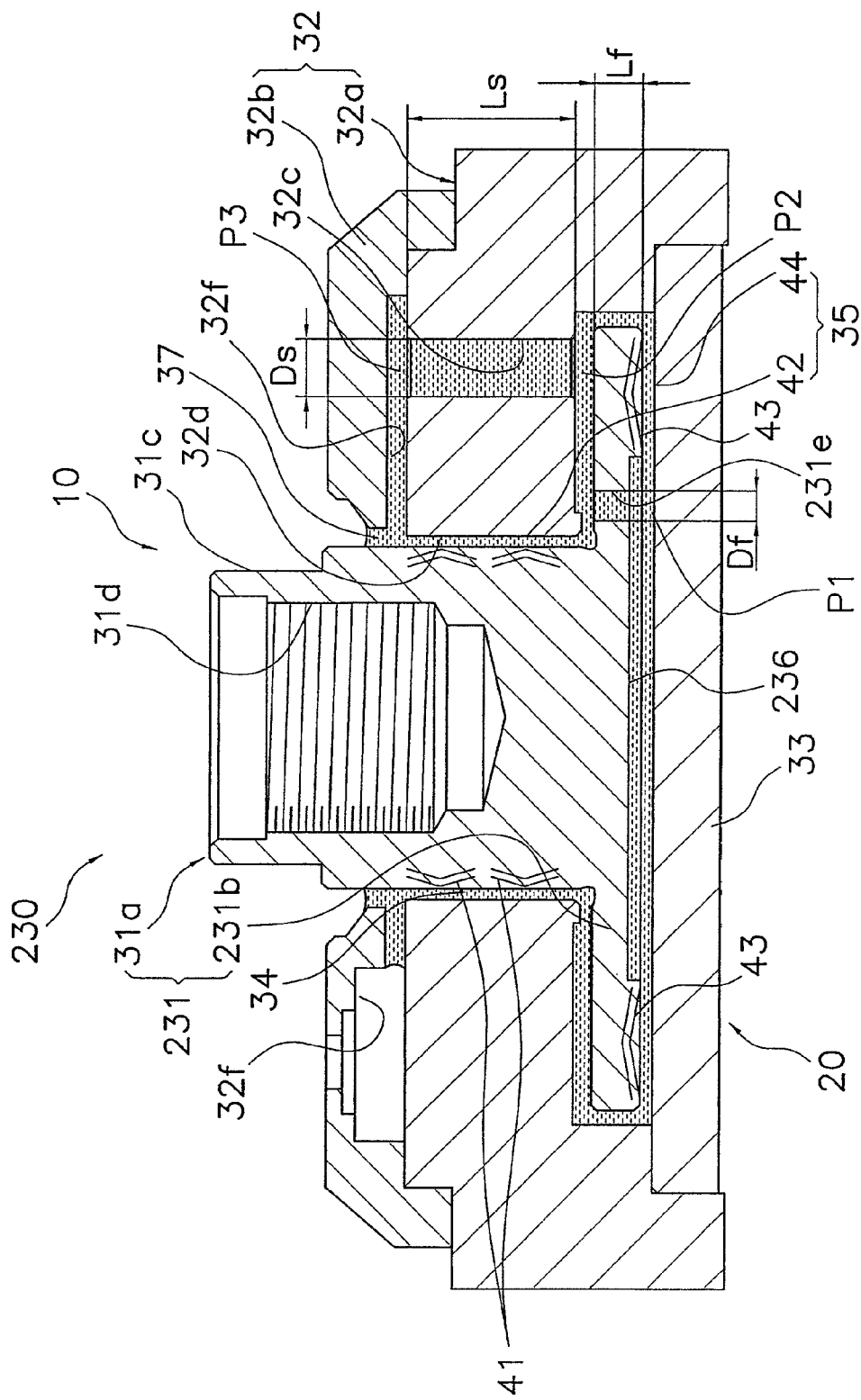
FIG. 9 is a cross section corresponding to FIG. 3 of the hydrodynamic bearing device pertaining to yet another embodiment of the present invention.

In view of this, as shown in FIG. 9, a bubble suppression portion 236 may be formed on the lower face of a flange 231b of a hydrodynamic bearing device 230, and have a larger diameter than the main portion 31a so as to communicate directly with a communicating hole 231e.

(B)

In the above embodiment, the main portion 31a and the flange 31b were formed integrally in the shaft, but may instead be separate.

Figure 10:
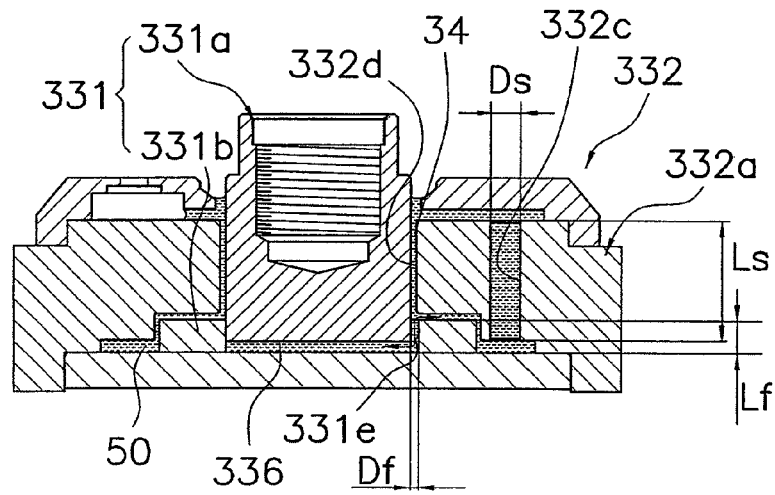
FIG. 10 is a cross section corresponding to FIG. 3 of the hydrodynamic bearing device pertaining to yet another embodiment of the present invention.

In FIG. 10, a shaft 331 of a hydrodynamic bearing device 330 has a cylindrical main portion 331a and a flange 331b (an example of the large-diameter portion) fixed to the lower end (one end) of the main portion 331a. The lower end face of the main portion 331a is disposed above the lower end of the shaft 331 as a whole, that is, above the lower end face of the flange 331b, and the lower end face of the shaft 331 is recessed. This recessed portion serves as a bubble suppression portion 336.

The flange 331b is fixed to the lower end outer peripheral face of the main portion 331a by press-fitting, adhesive bonding, laser welding, or another suitable fixing means. At least one communicating hole (an example of the first communicating hole) 331e is formed at a location on the flange 331b that is close to the outer peripheral face of the main portion 331a. Three, for example, of the communicating holes 331e are formed spaced apart in the circumferential direction. The communicating holes 331e are formed by substantially semicircular arc-shaped grooves capable of direct communication with the bubble suppression portion 336, on the inner peripheral face of the flange 331b, so as to communicate between the upper and lower end faces of the flange 331b. Just as in the above embodiment, pressure loss at the communicating hole 331e is smaller than the pressure loss at the communicating hole 332c.

The equivalent diameter De in the case of the semicircular communicating holes 331e is derived from the following Relational Formula 22, and if we let d be the diameter of the circle of the communicating holes 331e, the result is 0.611015d. Therefore, as shown in TABLE 2, when the diameter Ds of the communicating hole 32c is 0.4 mm, the length Ls is 6.5 mm, and the length Lf is 0.6 mm, the diameter of the circle of the three communicating holes 331e may be 0.1675/0.611015=0.2741 or greater, such as 0.3 mm.

$$De = 4 \frac{\frac{\pi d^2}{4}\frac{1}{2}}{\left(\frac{\pi d}{2}+d\right)} = \frac{\pi d^2}{\left(\frac{\pi}{2}+1\right)} = 0.611015d \quad (22)$$

Also, a bearing hole 332d in the main part 332a of the sleeve 32 has a two-part step, and the communicating hole 332c is disposed outward in the radial direction of the flange 331b.

(C)

In the above embodiment, a flange acting as a thrust bearing portion was given as an example of the large-diameter portion, but the large-diameter portion need only be larger in diameter than the main portion, and may be a shaft retainer instead.

Figure 11:
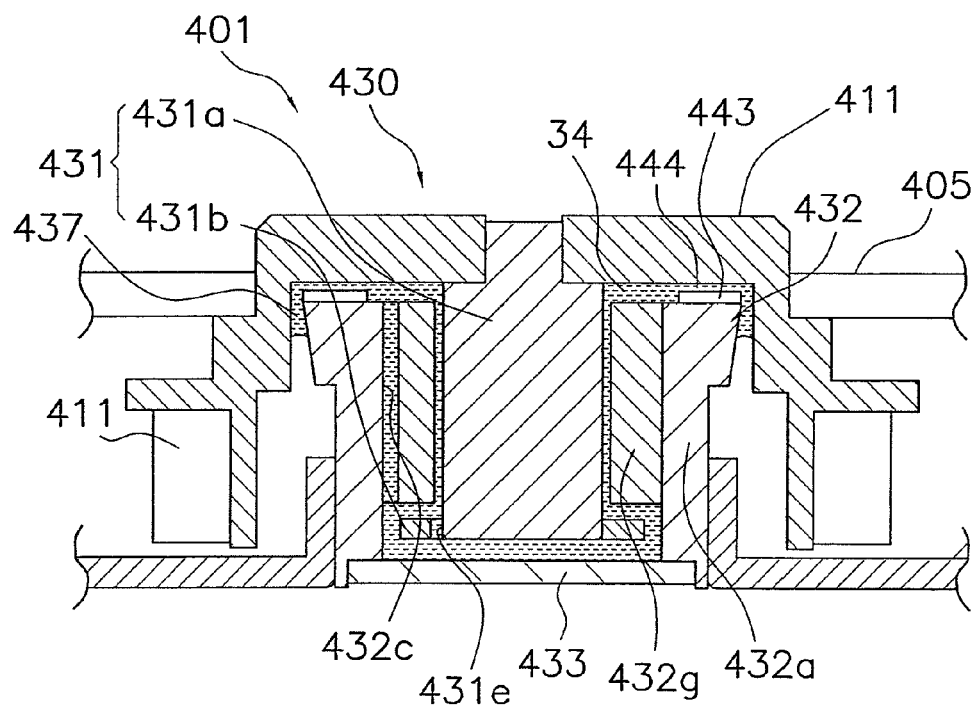
FIG. 11 is a cross section corresponding to FIG. 3 of the hydrodynamic bearing device pertaining to yet another embodiment of the present invention.

In FIG. 11, a shaft 431 of a hydrodynamic bearing device 430 of a spindle motor 401 has a main portion 431a and a large-diameter retainer portion 431b (an example of the large-diameter portion) that is fixed to the lower end outer peripheral face of the main portion 431a by press-fitting, adhesive bonding, welding, screws, or another such means and serves to keep the shaft 431 from coming loose. The retainer portion 431b is separate from the main portion 431a here, but may also be integrated. The lower face of the main portion 431a and the lower face of the retainer portion 431b lie in the same plane, and no bubble suppression portion is formed. However, a bubble suppression portion may be formed by fixing the retainer portion 431b so that the main portion 431a is recessed, as in the embodiment shown in FIG. 10.

Communicating holes 431e (an example of the first communicating hole) pass through the upper and lower faces of the retainer portion 431b, and open in a semicircular arc shape near the outer peripheral face of the main portion 431a. The communicating holes 431e are spaced apart in the circumferential direction, and three of them are disposed, for example.

A sleeve 432 does not have a sleeve cap, unlike in the above embodiment. The sleeve 432 has a cylindrical inner sleeve member 432g and an outer sleeve member 432h that is fixed to the outer peripheral face of the inner sleeve member 432g by press-fitting, adhesive bonding, or another suitable fixing means. A taper seal 437 for sealing in the oil 34 is formed between a hub 411 and the upper outer peripheral face of the outer sleeve member 432h. Therefore, the hub 411 not only serves to mount a rotor magnet 412 and a recording disk 405, but also functions as a sleeve cap.

Also, a thrust bearing portion 444 is provided between the hub 411 and the outer sleeve member 432h, and a thrust hydrodynamic groove 443 is formed on the top face of the outer sleeve member 432h.

A communicating hole 432c in the sleeve 432 is formed in a what is known as a D-cut shape, which has a substantially D-shaped cross section. The communicating hole 432c is formed by the planar cutting out of the outer peripheral face of the inner sleeve member 432g, and is formed in one place, for example.

The equivalent diameter De of the D-cut-shaped communicating hole 432c can be calculated by the following procedure.

Figure 12:
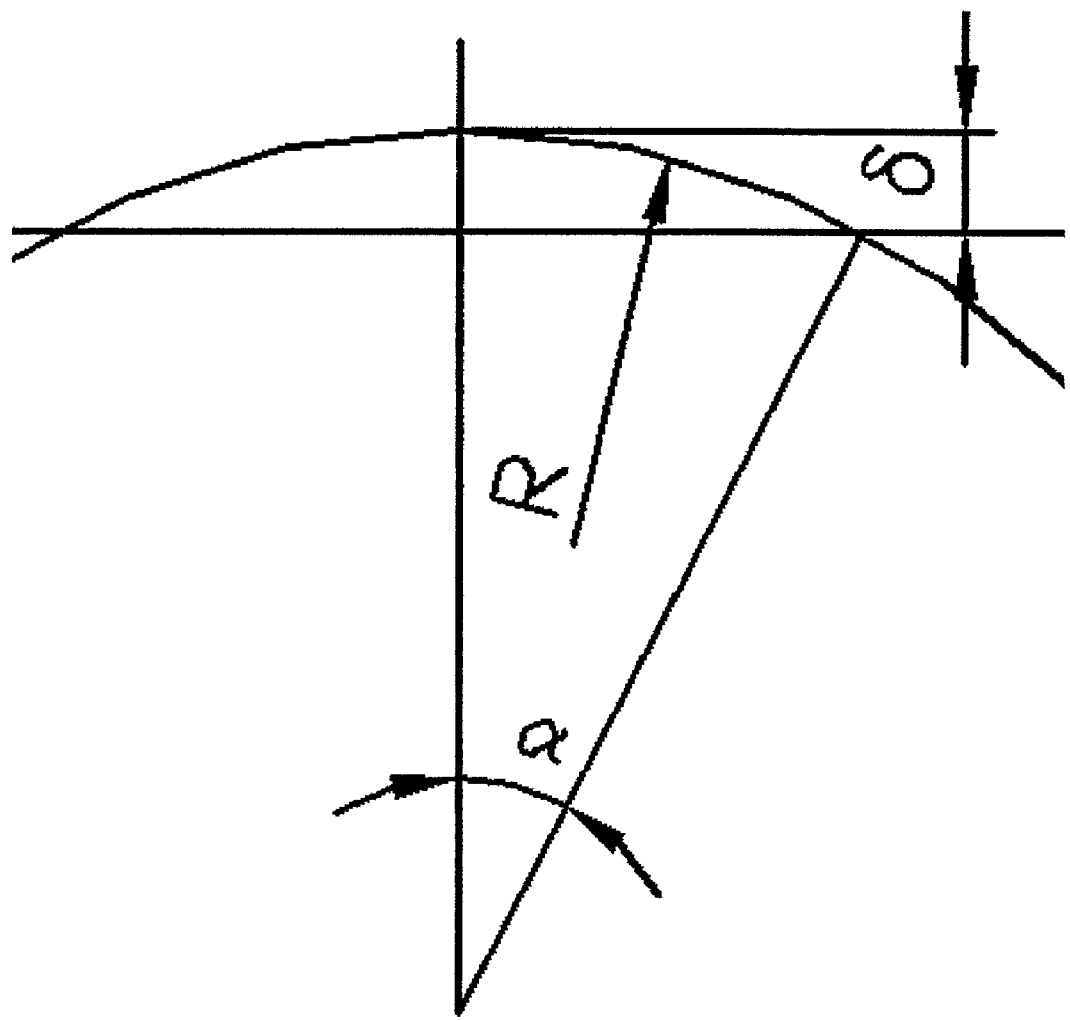
FIG. 12 is a schematic diagram illustrating the equivalent diameter in the case of a D-cut shape.

As shown in FIG. 12, when a D-cut shape with a depth of δ is formed in the outer peripheral face of a cylinder with a radius R, the center angle α thereof is calculated from the following Relational Formula 23.

$$\alpha = \cos^{-1}\left(\frac{R-\delta}{R}\right), \quad \sin\alpha = \frac{\sqrt{\delta(2R-\delta)}}{R} \tag{23}$$

The peripheral length S required to find the equivalent diameter De by using this angle is found from the following Relational Formula 24, and the surface area A is found from the following Relational Formula 25, so when these are substituted for the above-mentioned equivalent diameter De=4A/S, the following Relational Formula 26 is obtained.

$$S = R\left(2\sin\alpha + \frac{\alpha}{\pi}\right) \tag{24}$$

$$A = \alpha R^2 \tag{25}$$

-continued $$De = \frac{4A}{S} \tag{26}$$
$$= \frac{4\alpha R^2}{R\left(2\sin\alpha + \frac{\alpha}{\pi}\right)}$$
$$= \frac{4\alpha R}{\left(2\frac{\sqrt{\delta(2R-\delta)}}{R} + \frac{\cos^{-1}\left(\frac{R-\delta}{R}\right)}{\pi}\right)}$$

Thus, the large-diameter portion may be the retainer portion 431b that does not function as a thrust bearing portion. Also, the first and second communicating holes do not need to be round holes, and may have any cross sectional shape as long as they are through-holes.

(D)

In the above embodiment, the number of communicating holes 131e to 431e was three and the number of communicating holes 32c and 432c was one, but the numbers of communicating holes are not limited to these, and the equivalent diameter, number, and length of the first and second communicating holes may be determined so as to satisfy Relational Formula (1), and overall the number and shape of the various communicating holes may be determined so that the pressure loss of the first communicating hole of the shaft is smaller than the pressure loss of the second communicating hole of the sleeve.

(E)

In the above embodiment, the description was of an example in which a radial hydrodynamic groove was formed in the outer peripheral face of the shaft, and a thrust hydrodynamic groove was formed in the lower face of the shaft. The present invention, however, is not limited to this. For example, the radial hydrodynamic groove may be formed in the inner peripheral face of the sleeve, and the thrust hydrodynamic groove may be formed in the flange cover. Also, these grooves may be formed in both of these components, rather than in just one. Also, there may be a set of radial hydrodynamic grooves.

(F)

In the above embodiment, an example was given in which the stator 22 was disposed opposing to the outer peripheral side of the rotor magnet 12, but the present invention is not limited to this. For example, the spindle motor may be what is known as an outer rotor type, in which the stator is disposed opposing to the inner peripheral side of the rotor magnet. Or, the motor may be what is known as a flat motor, in which a ring-shaped magnet and a hollow coil are disposed opposing to each other in the axial direction.

(G)

In the above embodiment, a configuration was described in which the shaft rotated and the sleeve was sealed at one end, but the present invention is not limited to this. For example, the configuration may be one in which the shaft is fixed and the sleeve rotates. Furthermore, the configuration may also be one in which the sleeve is open at both ends, and the upper and lower ends of the shaft are both fixed to the base.

(H)

In the above embodiment, a configuration was described in which the flange cover was fixed to the sleeve, but the present invention is not limited to this. For example, the flange cover may be fixed to the base member of the apparatus.

(I)

Figure 13:
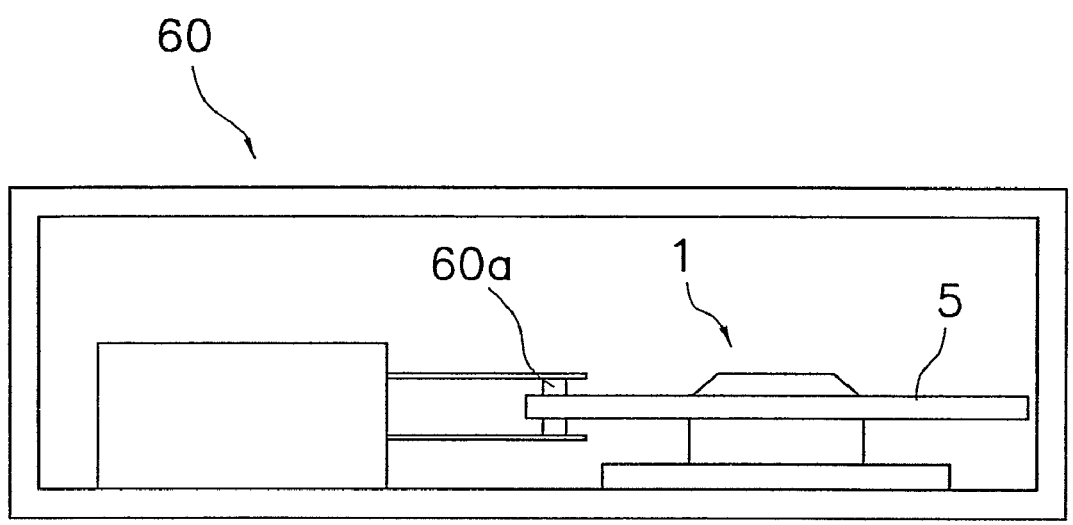
FIG. 13 is a cross section illustrating the configuration of a recording and reproducing apparatus pertaining to yet another embodiment of the present invention.
Figure 14:
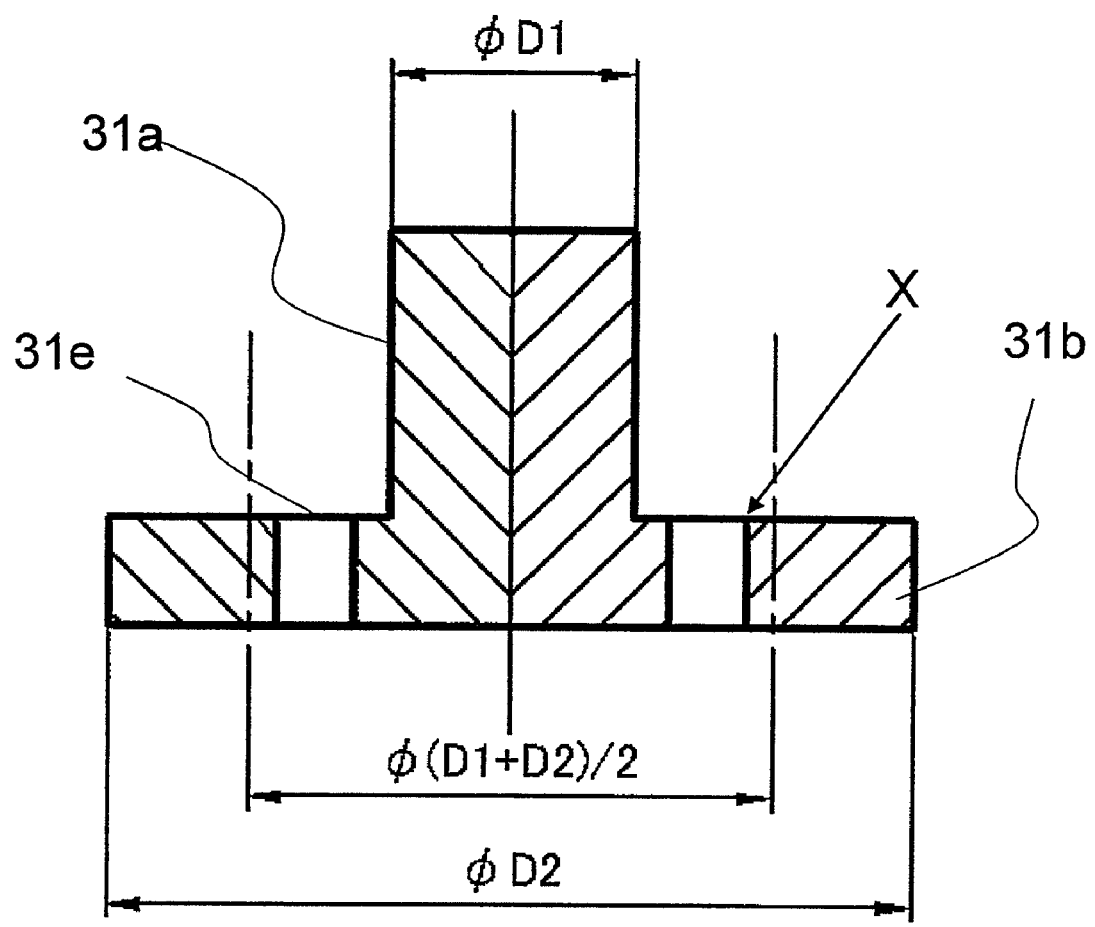
FIG. 14 is a schematic diagram illustrating the position of the first communicating holes.

In the above embodiment, an example was described in which the present invention was applied to the spindle motor 1, but the present invention is not limited to this. For example, as shown in FIG. 13, the present invention can also be applied to a recording and reproducing apparatus 60 in which the spindle motor 1 having the configuration discussed above is installed, and information recorded on the recording disk 5 is reproduced, or information is recorded to the recording disk 5, by a recording head 60a (an example of the information access portion). The effect of this is that even in usage applications where there is the possibility of strong vibration, a compact and lightweight recording and reproducing apparatus can be obtained with which vibration resistance is ensured and the generation of noise can be suppressed.

With the present invention, the durability and reliability of a spindle motor can be enhanced by making it less likely that negative pressure will be generated inside a bearing portion even when the hydrodynamic bearing device is subjected to impact or vibration, so the present invention can be widely applied, for example, to disk drive apparatus, reel drive apparatus, capstan drive apparatus, drum drive apparatus, polygonal mirror apparatus for laser scanners, and so forth.

The invention claimed is:

1. A hydrodynamic bearing device, comprising:
a sleeve that has an insertion hole that is open at one end;
a shaft configured to be disposed in the insertion hole of the sleeve so as to be capable of rotation relative to the sleeve, and have a main portion and a large-diameter portion provided to the main portion and having a larger diameter than the main portion;
a lubricating fluid that fills a clearance formed between the sleeve and the shaft;
a bearing portion configured to support the sleeve and the shaft in the rotational direction and the axial direction with the lubricating fluid interposed in between; and
a flange cover that is provided to the sleeve and disposed opposing to one axial side of the large-diameter portion of the shaft,
wherein the shaft has at least one first communicating hole that communicates between the one axial side of the large-diameter portion that faces the flange cover and the other axial side of the large-diameter portion that does not face the flange cover,
the sleeve has at least one second communicating hole which communicates between two end faces of the sleeve,
the equivalent diameter Df, length Lf, and number Nf of the first communicating hole and the equivalent diameter Ds, length Ls, and number Ns of the second communicating hole satisfy the following relational formula (1):

$$\frac{Df}{Ds} > \sqrt[n]{\left(\frac{Ns}{Nf}\right)^m \left(\frac{Lf}{Ls}\right)} \quad (1)$$

and the equivalent diameters Df and Ds of the first and second communicating holes are four times of the quotients obtained by dividing the cross sectional areas Af and As of the first and second communicating holes by the peripheral lengths Sf and Ss, respectively, as expressed by the following relational formula (2):

$$Ds = 4\frac{As}{Ss}, \quad Df = 4\frac{Af}{Sf} \quad (2)$$

where the constants n and m in the relational formula (1) are numbers greater than or equal to 1, and the combination of the constants (n, m) satisfies at least one of (4, 1), 4.75, 1.75), and (5, 2).

2. The hydrodynamic bearing device according to claim 1, wherein the first communicating hole opens near the outer peripheral face of the main portion.

3. The hydrodynamic bearing device according to claim 1, wherein the large-diameter portion is formed integrally with the main portion.

4. The hydrodynamic bearing device according to claim 1, wherein the large-diameter portion is separate from the main portion and is fixed to the main portion.

5. A spindle motor, comprising:
a stationary member having a base and a stator that is fixed to the base;
a rotary member having a rotor magnet that is disposed opposing to the stator and constitutes a magnetic circuit along with the stator, and a hub that fixes the rotor magnet; and
hydrodynamic bearing device according to claim 1, which is fixed to the base, configured to support the rotary member rotatably with respect to the stationary member.

6. A recording and reproducing apparatus, comprising:
the spindle motor according to claim 5; and
an information access portion configured to write or read information to or from the required location on a recording medium on which information can be recorded, fixed to the hub.

7. A hydrodynamic bearing device, comprising:
a sleeve that has an insertion hole that is open at one end;
a shaft configured to be disposed in the insertion hole of the sleeve so as to be capable of rotation relative to the sleeve, and have a main portion and a large-diameter portion provided at one end of the shaft and having a larger diameter than the main portion;
a lubricating fluid that fills a clearance formed between the sleeve and the shaft;
a bearing portion configured to support the sleeve and the shaft in the rotational direction and the axial direction with the lubricating fluid interposed in between;
a flange cover that is provided to the sleeve and disposed opposing to one axial side of the large-diameter portion of the shaft; and
a bubble suppression portion that is formed recessed in the flange cover and opposed to the large-diameter portion of the shaft,
wherein the shaft has at least one first communicating hole that communicates between the one axial side of the large-diameter portion that faces the flange cover and the other axial side of the large-diameter portion that does not face the flange cover, and
the sleeve has at least one second communicating hole which communicates between two end faces of the sleeve.

8. The hydrodynamic bearing device according to claim 7, wherein the first communicating hole communicates with the bubble suppression portion.

9. The hydrodynamic bearing device according to claim 7, wherein the first communicating hole opens near the outer peripheral face of the main portion.

10. The hydrodynamic bearing device according to claim 7,
wherein the large-diameter portion is formed integrally with the main portion.

11. The hydrodynamic bearing device according to claim 7,
wherein the large-diameter portion is separate from the main portion and is fixed to the main portion.

12. A spindle motor, comprising:
a stationary member having a base and a stator that is fixed to the base;
a rotary member having a rotor magnet that is disposed opposing to the stator and constitutes a magnetic circuit along with the stator, and a hub that fixes the rotor magnet; and
hydrodynamic bearing device according to claim 7, which is fixed to the base, configured to support the rotary member rotatably with respect to the stationary member.

13. A recording and reproducing apparatus, comprising:
the spindle motor according to claim 12; and
an information access portion configured to write or read information to or from the required location on a recording medium on which information can be recorded, fixed to the hub.

14. A hydrodynamic bearing device, comprising:
a sleeve that has an insertion hole that is open at one end;
a shaft configured to be disposed in the insertion hole of the sleeve so as to be capable of rotation relative to the sleeve, and have a main portion and a large-diameter portion provided at one end of the shaft and having a larger diameter than the main portion;
a lubricating fluid that fills a clearance formed between the sleeve and the shaft;
a bearing portion configured to support the sleeve and the shaft in the rotational direction and the axial direction with the lubricating fluid interposed in between;
a flange cover that is provided to the sleeve and disposed opposing to one axial side of the large-diameter portion of the shaft; and
a bubble suppression portion that is formed recessed in the large-diameter portion of the shaft and opposed to the flange cover,
wherein the shaft has at least one first communicating hole that communicates between the one axial side of the large-diameter portion that faces the flange cover and the other axial side of the large-diameter portion that does not face the flange cover, the at least one first communicating hole communicating with the bubble suppression portion, and
the sleeve has at least one second communicating hole which communicates between two end faces of the sleeve.

15. The hydrodynamic bearing device according to claim 14,
wherein the first communicating hole opens near the outer peripheral face of the main portion.

16. The hydrodynamic bearing device according to claim 14,
wherein the large-diameter portion is formed integrally with the main portion.

17. The hydrodynamic bearing device according to claim 14,
wherein the large-diameter portion is separate from the main portion and is fixed to the main portion.

18. A spindle motor, comprising:
a stationary member having a base and a stator that is fixed to the base;
a rotary member having a rotor magnet that is disposed opposing to the stator and constitutes a magnetic circuit along with the stator, and a hub that fixes the rotor magnet; and
the hydrodynamic bearing device according to claim 14, which is fixed to the base, configured to support the rotary member rotatably with respect to the stationary member.

19. A recording and reproducing apparatus, comprising:
the spindle motor according to claim 18; and
an information access portion configured to write or read information to or from the required location on a recording medium on which information can be recorded, fixed to the hub.

* * * * *

UNITED STATES PATENT AND TRADEMARK OFFICE
CERTIFICATE OF CORRECTION

PATENT NO. : 7,854,552 B2
APPLICATION NO. : 12/024502
DATED : December 21, 2010
INVENTOR(S) : Toshifumi Hino et al.

Page 1 of 1

It is certified that error appears in the above-identified patent and that said Letters Patent is hereby corrected as shown below:

In column 16, line 49, "Table 2 3 mentioned above" should read --Table 2 mentioned below--.

In column 26, claim 1, line 9, "1), 4.75, 1.75)" should read --1), (4.75, 1.75)--.

Signed and Sealed this
Twenty-sixth Day of April, 2011

David J. Kappos
*Director of the United States Patent and Trademark Office*